United States Patent
Yamashita et al.

(10) Patent No.: US 12,066,533 B2
(45) Date of Patent: Aug. 20, 2024

(54) OBJECT DETECTION SYSTEM, OBJECT DETECTION METHOD AND OBJECT DETECTION DEVICE

(71) Applicant: Panasonic Intellectual Property Management Co., Ltd., Osaka (JP)

(72) Inventors: Hiroki Yamashita, Kanagawa (JP); Atsushi Seki, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 18 days.

(21) Appl. No.: 17/834,309

(22) Filed: Jun. 7, 2022

(65) Prior Publication Data
US 2023/0056917 A1   Feb. 23, 2023

(30) Foreign Application Priority Data
Aug. 17, 2021   (JP) ................. 2021-132986

(51) Int. Cl.
G01S 15/931   (2020.01)

(52) U.S. Cl.
CPC ................. *G01S 15/931* (2013.01)

(58) Field of Classification Search
None
See application file for complete search history.

(56) References Cited

U.S. PATENT DOCUMENTS

| | | | | |
|---|---|---|---|---|
| 5,767,793 A | * | 6/1998 | Agravante | H01Q 21/205 340/901 |
| 5,909,409 A | * | 6/1999 | Barber | G01S 15/86 367/125 |
| 7,176,789 B2 | * | 2/2007 | Herder | G01S 15/931 342/134 |
| 8,330,095 B2 | * | 12/2012 | Kawabata | G01S 17/04 250/221 |

(Continued)

FOREIGN PATENT DOCUMENTS

| | | |
|---|---|---|
| EP | 0493141 A1 * | 12/1991 |
| JP | 2012-247829 A | 12/2012 |

(Continued)

*Primary Examiner* — Isam A Alsomiri
*Assistant Examiner* — Jonathan D Armstrong
(74) *Attorney, Agent, or Firm* — Seed IP Law Group LLP

(57) ABSTRACT

An object detection system includes distance measurement sensors and a hardware processor functioning as a wave transmission control circuit and a determination circuit. The distance measurement sensors provided at different positions in a vehicle. The wave transmission control circuit sets one of the distance measurement sensors as a top of a wave transmission order. A detection range of the one of the distance measurement sensors covers a region where an object is located. The object has been detected through preliminary detection when power supply to the vehicle is started. The wave transmission control circuit then repeats a cyclic wave transmission control on the distance measurement sensors to emit ultrasonic waves sequentially in the wave transmission order. The determination circuit deter- (Continued)

mines an object as a detection target object when any one of the distance measurement sensors has detected the object a predetermined number of times.

17 Claims, 14 Drawing Sheets

(56) References Cited

U.S. PATENT DOCUMENTS

| | | | | |
|---|---|---|---|---|
| 8,433,445 B2* | 4/2013 | Busse | ................... | G01S 17/894 |
| | | | | 702/159 |
| 10,255,801 B2* | 4/2019 | Alameh | ................. | G08C 19/16 |
| 2003/0222812 A1* | 12/2003 | Kishida | .................. | G01S 13/34 |
| | | | | 342/115 |
| 2005/0088334 A1* | 4/2005 | Herder | ................. | G01S 15/003 |
| | | | | 342/70 |
| 2009/0096413 A1* | 4/2009 | Partovi | ............... | H01F 27/2804 |
| | | | | 320/108 |
| 2010/0245065 A1* | 9/2010 | Harada | ................. | G01S 15/003 |
| | | | | 340/435 |
| 2011/0098868 A1* | 4/2011 | Busse | ................... | G01S 17/04 |
| | | | | 700/295 |
| 2012/0065841 A1* | 3/2012 | Nagata | .................. | G08G 1/165 |
| | | | | 701/36 |
| 2012/0087212 A1* | 4/2012 | Vartanian | ................ | G01S 5/012 |
| | | | | 367/118 |
| 2012/0327239 A1* | 12/2012 | Inoue | .................... | G01S 15/876 |
| | | | | 348/148 |
| 2014/0225720 A1* | 8/2014 | Pozzi | ...................... | G01S 15/60 |
| | | | | 340/435 |
| 2014/0288415 A1* | 9/2014 | Forzoni | ................ | A61B 8/5284 |
| | | | | 600/407 |
| 2014/0300504 A1* | 10/2014 | Shaffer | ................... | G01S 13/86 |
| | | | | 367/93 |
| 2014/0333468 A1* | 11/2014 | Zhu | ........................ | G01S 13/867 |
| | | | | 342/54 |
| 2017/0123055 A1* | 5/2017 | Hustava | .................. | G01S 7/527 |
| 2017/0176594 A1* | 6/2017 | Ichikawa | ............... | G08G 1/166 |
| 2017/0267244 A1* | 9/2017 | Kim | .................... | B60W 10/182 |
| 2019/0265353 A1* | 8/2019 | Jones | .................. | G01S 15/8915 |
| 2019/0339386 A1* | 11/2019 | Ding | ..................... | G01S 15/325 |
| 2019/0366922 A1* | 12/2019 | Spiegel | ................... | B60Q 9/006 |
| 2020/0074759 A1* | 3/2020 | Seo | ........................ | G07C 5/008 |
| 2022/0317292 A1* | 10/2022 | Okabe | ..................... | G01S 7/527 |

FOREIGN PATENT DOCUMENTS

| | | | |
|---|---|---|---|
| JP | 2014006114 A | * | 1/2014 |
| JP | 5718726 B2 | | 5/2015 |

* cited by examiner

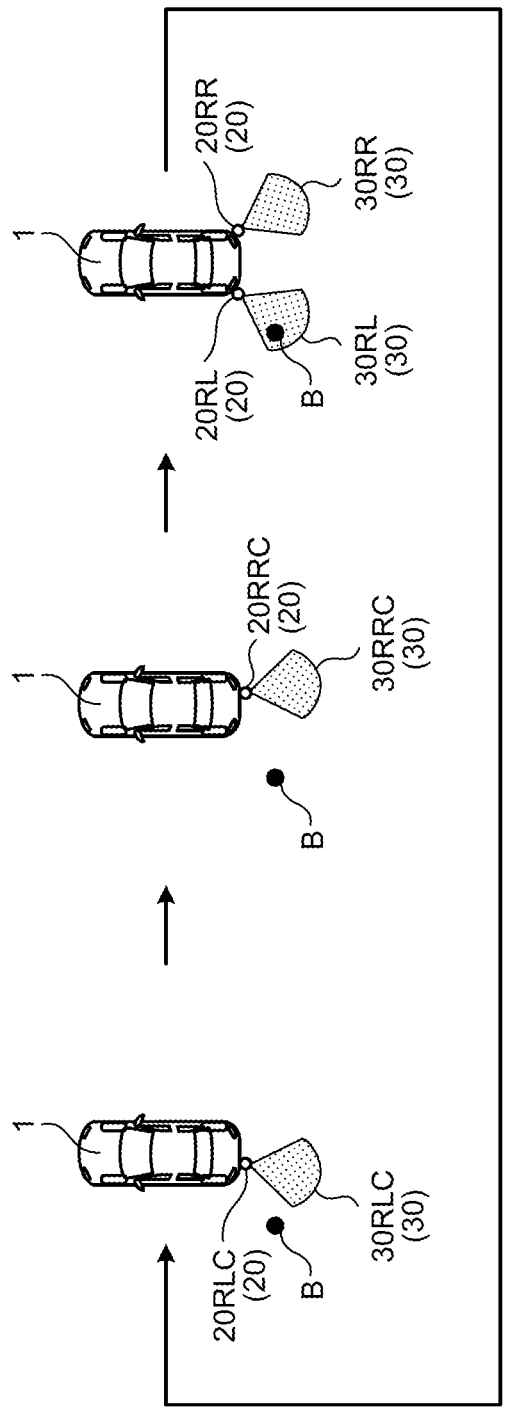

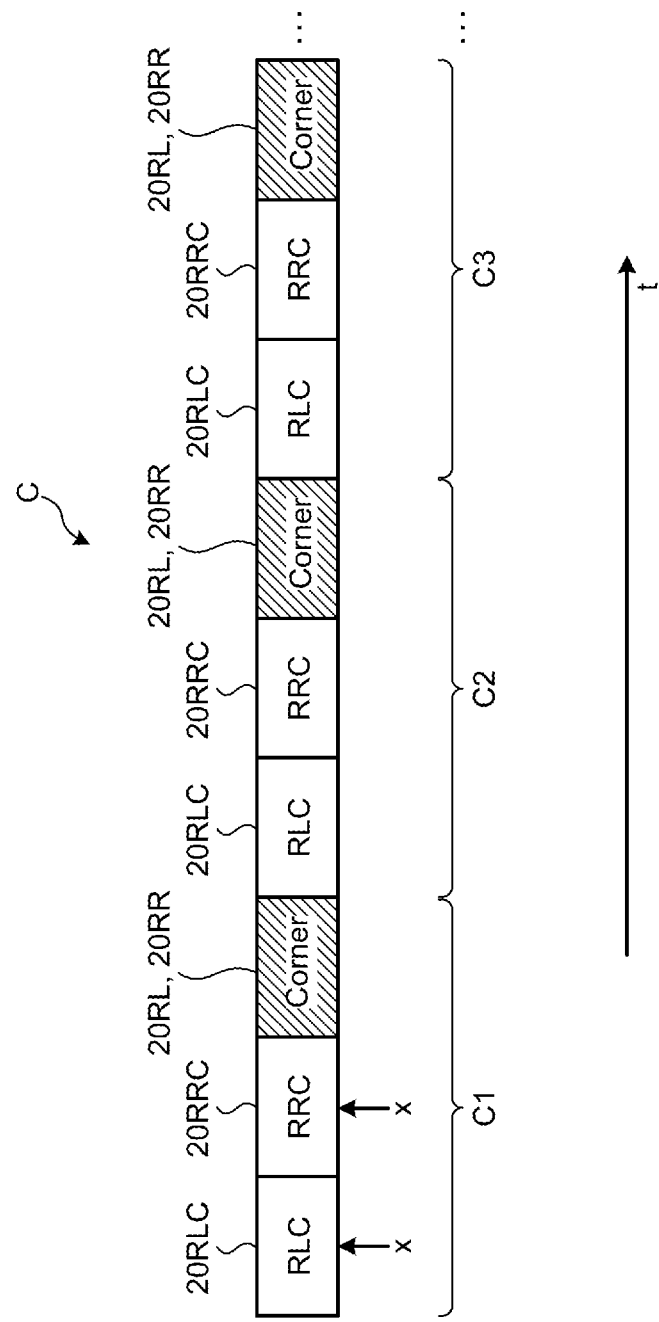

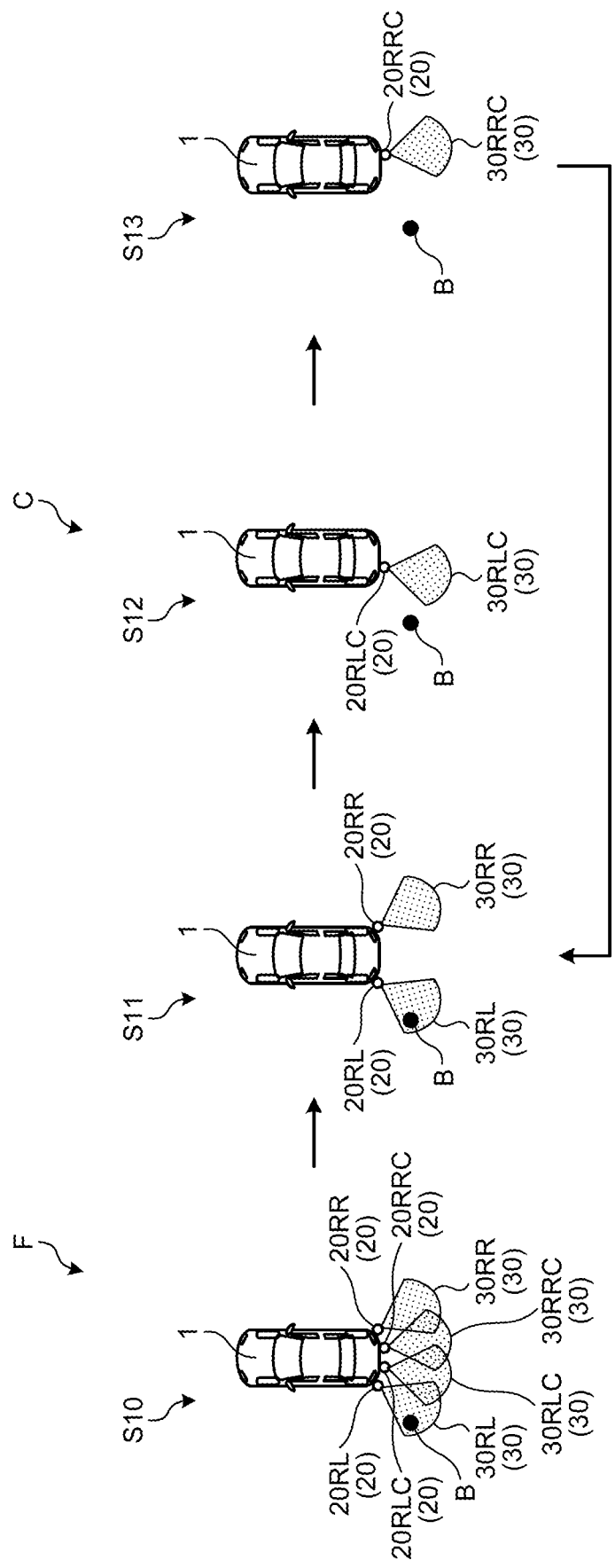

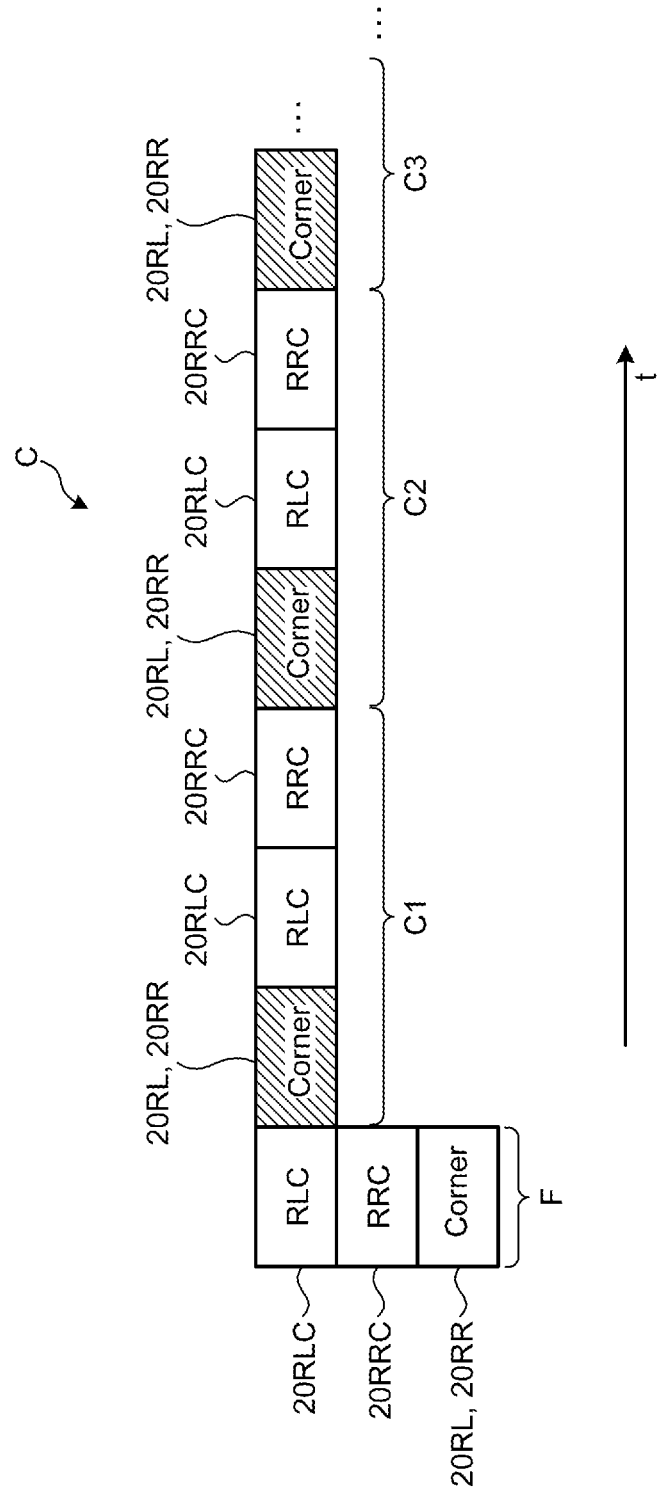

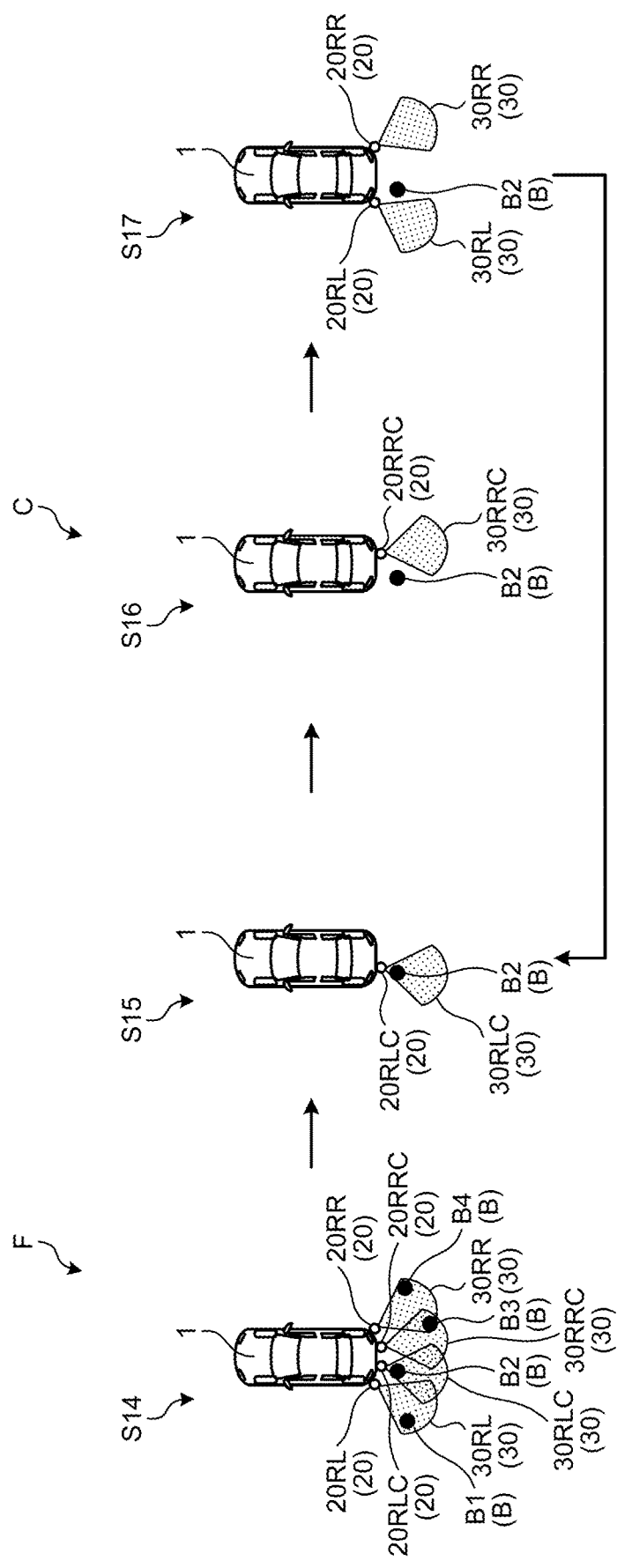

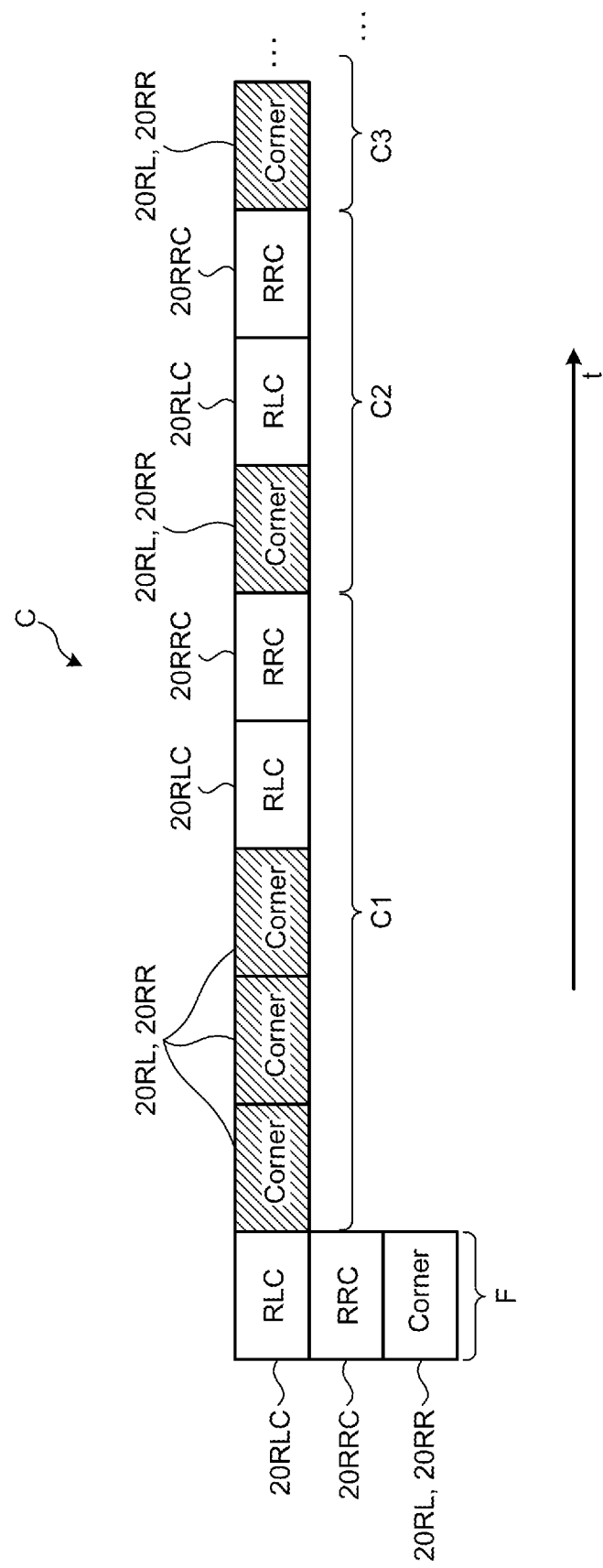

FIG.12
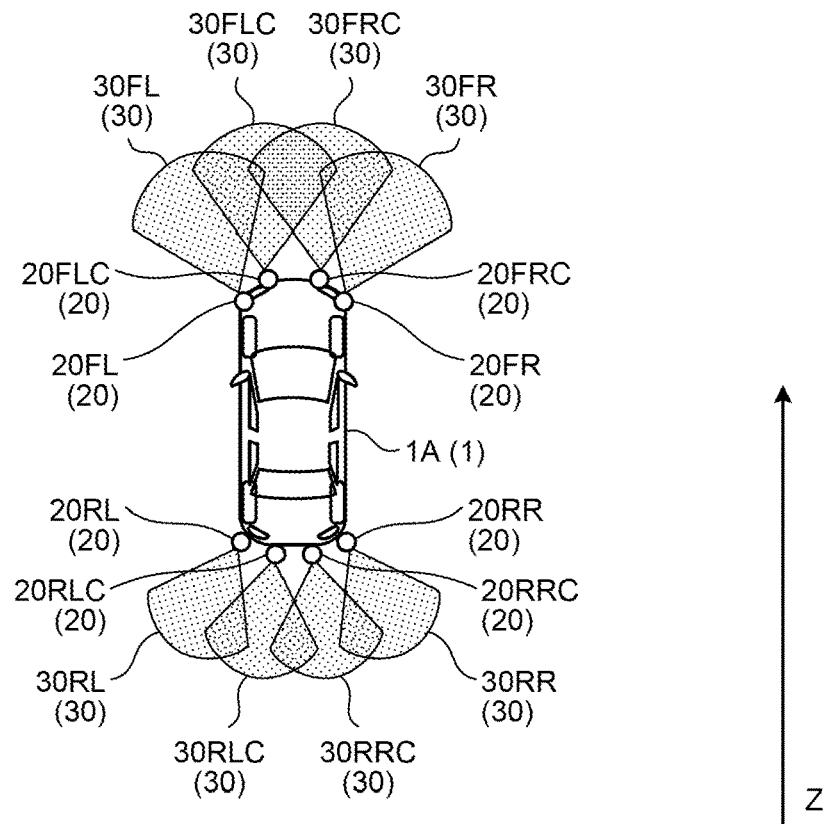
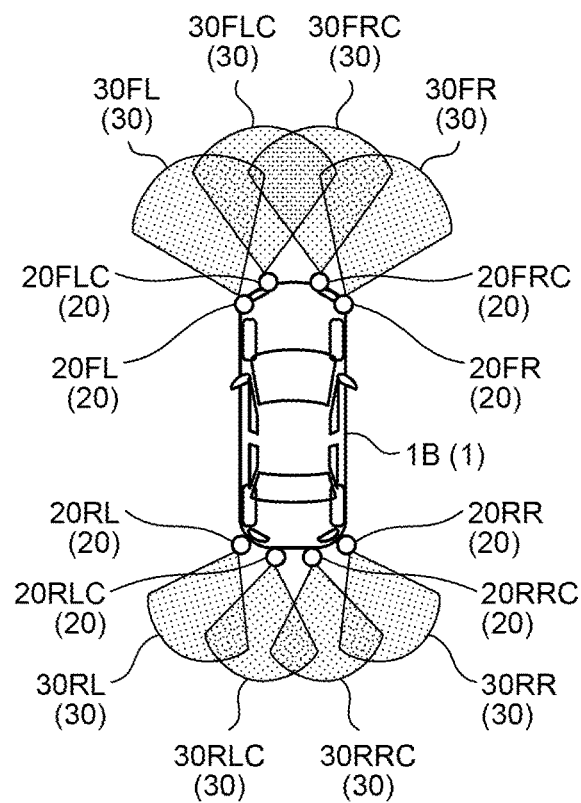

OBJECT DETECTION SYSTEM, OBJECT DETECTION METHOD AND OBJECT DETECTION DEVICE

CROSS-REFERENCE TO RELATED APPLICATIONS

This application is based upon and claims the benefit of priority from Japanese Patent Application No. 2021-132986, filed on Aug. 17, 2021, the entire contents of which are incorporated herein by reference.

FIELD

The present disclosure relates generally to an object detection system, an object detection method and an object detection device.

BACKGROUND

Conventionally, there is a known system for detecting an object present around a vehicle by using sensors mounted on the vehicle. For example, in order to suppress erroneous determinations, such a system scans an area within a detection range per predetermined control cycle by using a radio detection and ranging (Radar) device and determines an object detected a predetermined number of times or more as an object subject to contact determination. Moreover, there is a disclosed technology for shortening the detection time of an object by reducing the number of times of performing determinations when the object is detected in an image captured by an infrared camera (for example, Japanese Patent Application Laid-open No. 2012-247829 A).

However, in the conventional technology, the number of times of determinations is varied, sometimes making it difficult to perform highly accurate object detection. For example, with the conventional technology, it has been difficult to shorten the time for detecting an object and to achieve highly accurate object detection.

SUMMARY

An object detection system according to the present disclosure includes distance measurement sensors and a hardware processor functioning as a wave transmission control unit and a determination unit. The distance measurement sensors are provided at different positions from each other in a vehicle. The distance measurement sensors each include a wave transmitter to emit ultrasonic waves and a wave receiver to receive reflected ultrasonic waves reflected at an object. The distance measurement sensors are each configured to detect the object in accordance with the reflected ultrasonic waves. The wave transmission control unit serves to set one of the distance measurement sensors as a top of a wave transmission order. A detection range of the one of the distance measurement sensors covers a region where an object is located. The object has been detected through preliminary detection when power supply to the vehicle is started. The wave transmission control unit serves to repeat a cyclic wave transmission control on the distance measurement sensors to emit ultrasonic waves sequentially in the wave transmission order. The determination unit serves to determine an object as a detection target object when any one of the distance measurement sensors has detected the object a predetermined number of times.

BRIEF DESCRIPTION OF THE DRAWINGS

FIG. 5A is an explanatory diagram illustrating an example of conventional wave transmission control;

FIG. 5B is an explanatory diagram illustrating the example of the conventional wave transmission control;

FIG. 6A is an explanatory diagram illustrating an example of wave transmission control according to the embodiment;

FIG. 6B is an explanatory diagram illustrating the example of the wave transmission control according to the embodiment;

FIG. 7 is an explanatory diagram illustrating an example of the wave transmission control according to the embodiment;

FIG. 8 is an explanatory diagram illustrating the example of the wave transmission control according to the embodiment;

FIG. 12 is an explanatory diagram illustrating an example of vehicles, each equipped with the object detection device according to the embodiment has been mounted.

DETAILED DESCRIPTION

An object detection system, an object detection method and an object detection device according to an embodiment of the present disclosure will now be described herein with reference to the accompanying drawings.

Figure 1:
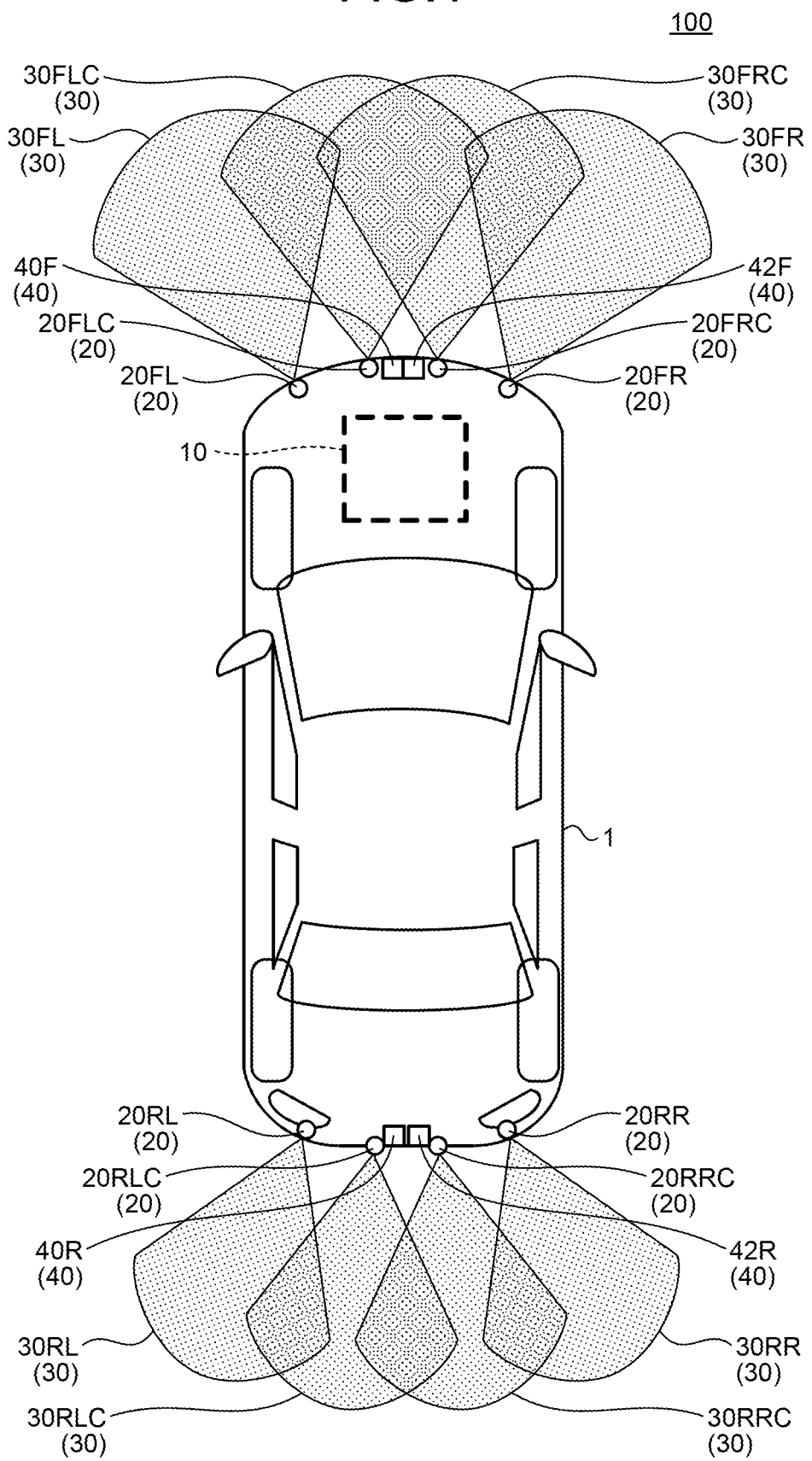
FIG. 1 is a schematic view illustrating an example of an object detection system according to an embodiment.

FIG. 1 is a schematic view illustrating an example of an object detection system 100.

The object detection system 100 includes an object detection device 10 and plural distance measurement sensors 20. The object detection device 10 is a device configured to detect an object that is present around a vehicle 1. In the present embodiment, the object detection device 10 is described as an example in the form of being installed in the vehicle 1.

In the vehicle 1, the distance measurement sensors 20 are provided.

The distance measurement sensors 20 are sensors each configured to detect an object that is present around the vehicle 1. In the present embodiment, the distance measurement sensors 20 each have a detection range from several centimeters to several meters and detect whether there is an object that is present at a relatively short distance and the distance to the object. In the present embodiment, the distance measurement sensors 20 are described as examples in the form of ultrasonic sensors. The ultrasonic sensors each include a wave transmission function to emit ultrasonic waves at a frequency ranging from 20 kHz to 100 kHz as transmission waves and a reception function to receive ultrasonic waves as reflected waves reflected at an object.

In the present embodiment, the vehicle 1 includes, as the distance measurement sensors 20, a distance measurement sensor 20FL, a distance measurement sensor 20FLC, a distance measurement sensor 20FRC, a distance measurement sensor 20FR, a distance measurement sensor 20RL, a distance measurement sensor 20RLC, a distance measurement sensor 20RRC, and a distance measurement sensor 20RR. The distance measurement sensors 20 are provided at positions that differ from each other in the vehicle 1. Detection ranges 30 of the distance measurement sensors 20 are adjusted such that at least respective parts of them do not overlap with each other.

The distance measurement sensor 20FL, the distance measurement sensor 20FLC, the distance measurement sensor 20FRC, and the distance measurement sensor 20FR are provided on a front portion of the vehicle 1. The distance measurement sensor 20FL and the distance measurement sensor 20FR are provided at corners on the front portion of the vehicle 1. The distance measurement sensor 20FL is provided at the left corner on the front portion of the vehicle 1. The distance measurement sensor 20FR is provided at the right corner on the front portion of the vehicle 1. The distance measurement sensor 20FLC is provided around the center but shifted in the left direction from the center on the front portion of the vehicle 1. The distance measurement sensor 20FRC is provided around the center but shifted in the right direction from the center on the front portion of the vehicle 1.

A detection range 30FL of the distance measurement sensor 20FL, a detection range 30FLC of the distance measurement sensor 20FLC, a detection range 30FRC of the distance measurement sensor 20FRC, and a detection range 30FR of the distance measurement sensor 20FR are arranged such that at least parts of them do not overlap with each other. Note that the detection ranges 30 of the distance measurement sensors 20 may be arranged to partially overlap with each other.

The distance measurement sensor 20RL, the distance measurement sensor 20RLC, the distance measurement sensor 20RRC, and the distance measurement sensor 20RR are provided on a rear portion of the vehicle 1. The distance measurement sensor 20RL and the distance measurement sensor 20RR are provided at corners on the rear portion of the vehicle 1. The distance measurement sensor 20RL is provided at the left corner on the rear portion of the vehicle 1. The distance measurement sensor 20RR is provided at the right corner on the rear portion of the vehicle 1. The distance measurement sensor 20RLC is provided around the center but shifted in the left direction from the center on the rear portion of the vehicle 1. The distance measurement sensor 20RRC is provided around the center but shifted in the right direction from the center on the rear portion of the vehicle 1.

A detection range 30RL of the distance measurement sensor 20RL, a detection range 30RLC of the distance measurement sensor 20RL, a detection range 30RRC of the distance measurement sensor 20RRC, and a detection range 30RR of the distance measurement sensor 20RR are arranged such that at least parts of them do not overlap with each other. Note that the detection ranges 30 of the distance measurement sensors 20 may be arranged to partially overlap with each other.

Note that the number and the arrangement of the distance measurement sensors 20 provided in the vehicle 1 are not limited to those of the above-described forms. For example, the distance measurement sensors 20 may be provided in such manners as one to three or four or more on a front portion of the vehicle 1, one to three or four or more on a rear portion of the vehicle 1, and one or more on each of side portions of the vehicle 1.

The distance measurement sensors 20 described above respectively detect an object that is present within their respective detection ranges 30, and output object detection result information to the object detection device 10.

The object refers to an object that the distance measurement sensors 20 are able to detect. For example, the object is an object from which reflected waves of ultrasonic waves emitted by the distance measurement sensors 20 are obtained.

Figure 2:
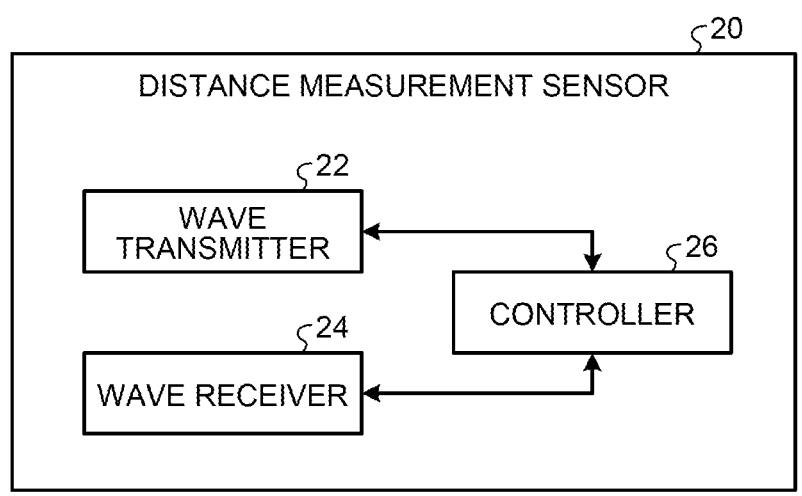
FIG. 2 is a schematic view illustrating an example of a configuration of a distance measurement sensor according to the embodiment.

FIG. 2 is a schematic view illustrating an example of a configuration of each of the distance measurement sensors 20. The distance measurement sensors 20 each include a wave transmitter 22, a wave receiver 24, and a controller 26. The wave transmitter 22, the wave receiver 24, and the controller 26 are communicably connected to each other. The controller 26 is communicably connected to the object detection device 10.

The wave transmitter 22 is configured to emit ultrasonic waves. The wave receiver 24 is configured to receive reflected ultrasonic waves reflected at an object. The wave transmitter 22 and the wave receiver 24 respectively emit and receive ultrasonic waves through piezoelectric elements, for example. The controller 26 is configured to control a wave transmission timing, a wave transmission period, and frequency of ultrasonic waves to be emitted from the wave transmitter 22. Additionally, the controller 26 measures a distance to an object by measuring a time from when the wave transmitter 22 emits ultrasonic waves to when the wave receiver 24 receives reflected waves. Upon detection of an object, the controller 26 outputs, to the object detection device 10, detection result information including object detection information indicative of object detection and distance information indicative of the distance to the object.

Now back to FIG. 1 to continue the description. In the vehicle 1, imaging devices 40 and radars 42 may further be provided.

The imaging devices 40 are each configured to capture an image of an area around the vehicle 1 and to acquire data of the captured image. In the following description, the data of the captured image will be simply referred to as a captured image. The imaging devices 40 output the acquired, captured images to the object detection device 10.

In the present embodiment, an imaging device 40F and an imaging device 40R are provided in the vehicle 1 as the imaging devices 40. The imaging device 40F is provided on the front portion of the vehicle 1 and configured to acquire a captured image of an area in front of the vehicle 1. The imaging device 40R is provided on the rear portion of the vehicle 1 and configured to acquire a captured image of an area behind the vehicle 1. Note that the number and the arrangement of the imaging devices 40 provided in the vehicle 1 are not limited to those of the above-described forms.

The radars 42 are each configured to detect an object that is present around the vehicle 1 and to measure a distance between the object and the vehicle 1. The radars 42 scan areas around the vehicle 1 by using millimeter waves that are electromagnetic waves to detect an object that is present in there. In the present embodiment, a radar 42F and a radar 42R are provided in the vehicle 1 as the radars 42.

The radar 42F is provided on the front portion of the vehicle 1 and scans an area in front of the vehicle 1 to detect an object that is present in front of the vehicle 1. The radar 42R is provided on the rear portion of the vehicle 1 and scans an area behind the vehicle 1 to detect an object that is present behind the vehicle 1. Note that the number and the arrangement of the radars 42 provided in the vehicle 1 are not limited to those of the above-described forms.

Next, a functional configuration of the object detection system 100 will now be described herein in detail.

Figure 3:
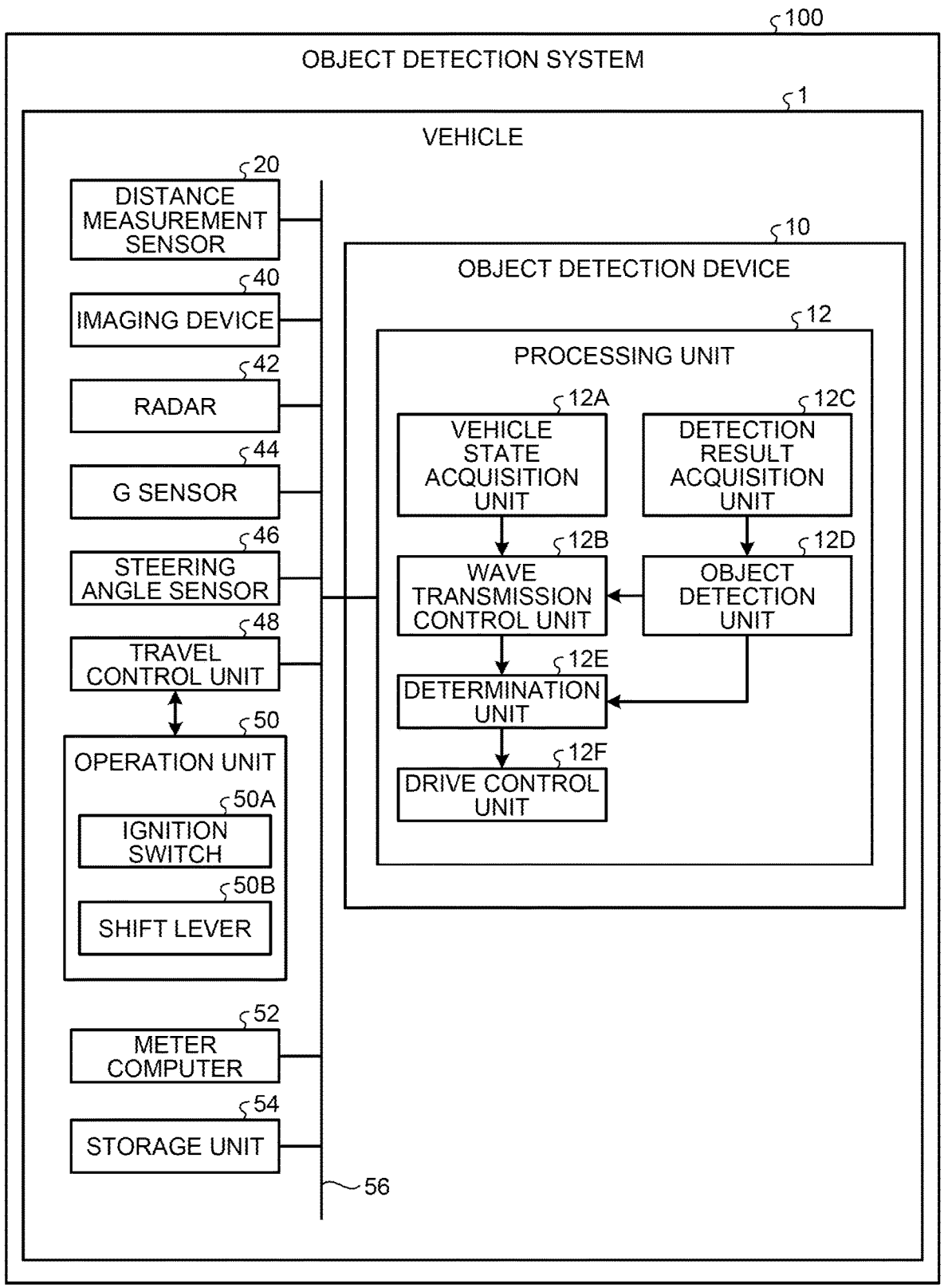
FIG. 3 is a block diagram illustrating an example of a functional configuration of the object detection system according to the embodiment.

FIG. 3 is a block diagram of an example of the functional configuration of the object detection system 100.

The vehicle 1 includes the distance measurement sensors 20, the imaging devices 40, the radars 42, a G sensor 44, a steering angle sensor 46, a travel control unit 48, operation units 50, a meter computer 52, storage units 54, and the object detection device 10.

The distance measurement sensors 20, the imaging devices 40, the radars 42, the G sensor 44, the steering angle sensor 46, the travel control unit 48, the meter computer 52, the storage units 54, and the object detection device 10 are communicably connected to each other via a bus 56. For the bus 56, a local area network such as a controller area network (CAN) may be used, for example.

The G sensor 44 is configured to measure a degree of acceleration of the vehicle 1 and output a measurement result to the object detection device 10. In the present embodiment, the G sensor 44 is described as an example in the form where a measurement result including a vehicle speed of the vehicle 1 and a degree of acceleration of the vehicle 1 is outputted to the object detection device 10.

The steering angle sensor 46 is configured to detect a steering angle of a steering wheel provided in the vehicle 1 and to output the detected steering angle as steering angle information to the object detection device 10.

The travel control unit 48 is an engine control unit (ECU) configured to control traveling of the vehicle 1. The travel control unit 48 is communicably connected to the operation units 50. The travel control unit 48 is configured to execute, in accordance with operation information of operations that a user has performed and that the operation units 50 have received, control of drive devices such as an engine and a motor of the vehicle 1, and control of devices relating to a transmission system, such as a transmission of the vehicle 1.

The operation units 50A are operated by a driver who is the user. The operation units 50 include, for example, an ignition switch 50A, a shift lever 50B, an accelerator pedal 50C, and a brake pedal 50D. Note that the operation units 50 mounted on the vehicle 1 are not limited to these parts described above.

The travel control unit 48 is configured to control the drive devices and the devices relating to the transmission system of the vehicle 1, in accordance with operation information of the ignition switch 50A, shift position information of the shift lever 50B, accelerator pedal operation information of the accelerator pedal 50C, and brake pedal information of the brake pedal 50D, for example. Moreover, in the present embodiment, the travel control unit 48 outputs the operation information of the ignition switch 50A and the shift position information of the shift lever 50B to the object detection device 10.

The operation information of the ignition switch 50A is information indicative of, for example, a power supply instruction to each part of an electrical system of the vehicle 1, and an engine start instruction to the vehicle 1. Upon reception of a power supply instruction to each part of the electrical system of the vehicle 1, the travel control unit 48 starts supplying power to electronic devices mounted on the vehicle 1. Furthermore, upon reception of an engine start instruction to the vehicle 1, the travel control unit 48 starts the engine of the vehicle 1.

The shift position information of the shift lever 50B is information indicative of a position of the shift lever 50B. The shift position information is indicative of, for example, one of the shift positions including parking (P), reverse (R), neutral (N), and forward driving (D).

The meter computer 52 includes information notification functions each configured to give notification to the user such as a driver. The information notification functions include, for example, a display function configured to display information and a sound output function configured to output sound presenting information. The display function is implemented by, for example, a combination meter device configured to give notifications to the driver through indication. The sound output function is implemented by, for example, a buzzer or a notification sound generator configured to give notifications through voice sounds.

The storage units 54 are each configured to store various data. The storage units 54 include, for example, semiconductor memory devices such as a random access memory (RAM) and a flash memory, a hard disk, and an optical disk. The storage units 54 may include one or more storage media.

Next, the object detection device 10 will now be described herein in detail.

Figure 4:
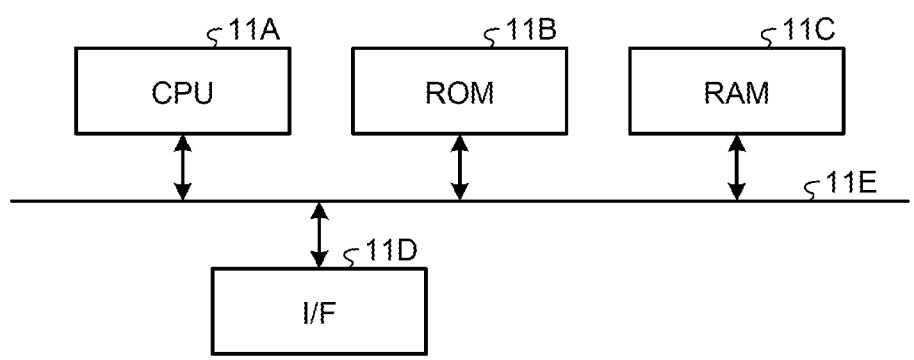
FIG. 4 is a hardware configuration view illustrating an example of an object detection device according to the embodiment.

FIG. 4 is a hardware configuration view illustrating an example of the object detection device 10.

In the object detection device 10, a central processing unit (CPU) 11A, a read only memory (ROM) 11B, a RAM 11C, and an interface (I/F) 11D, for example, are connected to each other via a bus 11E, forming a hardware configuration utilizing an ordinary computer.

The CPU 11A (an example of the hardware processor) is an arithmetic device configured to control the object detection device 10 according to the present embodiment. The ROM 11B is configured to store, for example, computer programs for implementing various processing to be executed by the CPU 11A. The RAM 11C is configured to store, for example, data that is necessary for various processing to be executed by the CPU 11A. The I/F 11D is an interface used for transmitting and receiving data.

The computer programs used for information processing to be executed by the object detection device 10 according to the present embodiment are incorporated in advance into the ROM 11B or the like and are provided. Note that such a configuration may be applied that the computer programs to be executed by the object detection device 10 according to the present embodiment are each created in the form of a file in a format that is able to be installed in or is able to be executed by the object detection device 10, and are recorded in and provided through a computer readable recording medium such as a CD-ROM, a flexible disc (FD), a CD-R, or a digital versatile disk (DVD).

Now back to FIG. 3 to continue the description.

The object detection device 10 controls emission of ultrasonic waves performed by each of the distance measurement sensors 20.

FIGS. 5A and 5B are explanatory diagrams illustrating an example of conventional wave transmission control. In FIGS. 5A and 5B, the conventional wave transmission control for the distance measurement sensors 20 provided on the rear portion of the vehicle 1 is exemplified.

When the distance measurement sensors 20 emit ultrasonic waves simultaneously, it may be impossible to distinguish reflected waves of the ultrasonic waves that the distance measurement sensors 20 have emitted, possibly lowering accuracy in measuring a distance to an object B. Considering this issue, the distance measurement sensors 20 are controlled to sequentially emit ultrasonic waves and detect the object B.

For example, as illustrated in FIG. 5A, the distance measurement sensor 20RLC, the distance measurement sensor 20RRC, the distance measurement sensor 20RL, and the distance measurement sensor 20RR are controlled to sequentially emit, in this order, ultrasonic waves. The distance measurement sensor 20RL and the distance measurement sensor 20RR are provided at the corners of the vehicle 1, namely, at both ends in the width direction of the vehicle 1, where there is less impact of interference. Therefore, they are controlled to simultaneously emit ultrasonic waves.

Moreover, in order to prevent erroneous detections such as noise and to improve reliability, processing is performed such that, when the same object B is detected a predetermined number of times or more, the object B is identified as a detection target object.

For example, as illustrated in FIG. 5A, it is assumed that the object B is present in the detection range 30RL of the distance measurement sensor 20RL. Additionally, it is also assumed that, when the same distance measurement sensor 20 detects the object B three or more times, the object B is determined as a detection target object.

In this case, as illustrated in FIG. 5B, the distance measurement sensor 20RL and the distance measurement sensor 20RR emit ultrasonic waves, which is the last transmission timing in each of a first cycle C1, a second cycle C2, and a third cycle C3, and then the distance measurement sensor 20RL detects the object B three times. For example, the distance measurement sensor 20RL and the distance measurement sensor 20RR emit ultrasonic waves, which is the last transmission timing of the third cycle C3, and thereby the object B present in the detection range 30RL of the distance measurement sensor 20RL is identified as the detection target object. Therefore, in the conventional technology, two wave transmissions by the distance measurement sensor 20RLC and the distance measurement sensor 20RRC respectively in the first cycle C1 are unnecessary wave transmissions X.

Due to this issue, in the conventional technology, a longer time may sometimes be required to determine a detection target object. For example, in the conventional technology, it has been difficult to shorten the time for detecting the object B.

Now back to FIG. 3 to continue the description. The object detection device 10 according to the present embodiment is a device that makes it possible to shorten the time for detecting the object B and to achieve highly accurate object detection.

More specifically, the object detection device 10 includes a processing unit 12. The processing unit 12 is configured to execute various information processing. For example, functional parts of the processing unit 12 described later are implemented on the computer by that, the CPU 11A reads out the computer programs from the ROM 11B onto the RAM 11C and executes the computer programs.

The processing unit 12 includes a vehicle state acquisition unit 12A, a wave transmission control unit 12B, a detection result acquisition unit 12C, an object detection unit 12D, a determination unit 12E, and a drive control unit 12F. Part of or all the vehicle state acquisition unit 12A, the wave transmission control unit 12B, the detection result acquisition unit 12C, the object detection unit 12D, the determination unit 12E, and the vehicle state drive control unit 12F may be implemented by, for example, causing a processing device such as the CPU 11A to execute the computer programs being pieces of software, or may be implemented in the form of hardware such as an integrated circuit (IC), or may be implemented in the form of using both software and hardware. Moreover, a configuration may be employed such that, for example, at least one of the vehicle state acquisition unit 12A, the wave transmission control unit 12B, the detection result acquisition unit 12C, the object detection unit 12D, the determination unit 12E, and the drive control unit 12F is installed in an external information processing device that is communicably connected to the object detection device 10 via a network.

The vehicle state acquisition unit 12A is configured to acquire information indicative of a vehicle state of the vehicle 1.

The information indicative of the vehicle state is information indicative of the state of the vehicle 1. The information indicative of the vehicle state includes, for example, a vehicle speed, a degree of acceleration, steering angle information, operation information of the ignition switch 50A, and shift position information of the vehicle 1. Note that it is sufficient that the information indicative of the vehicle state is information including at least the operation information of the ignition switch 50A and the shift position information.

In the present embodiment, the vehicle state acquisition unit 12A acquires measurement result information of the vehicle speed and the degree of acceleration of the vehicle 1 from the G sensor 44. Moreover, the vehicle state acquisition unit 12A acquires steering angle information from the steering angle sensor 46. Furthermore, the vehicle state acquisition unit 12A acquires the operation information of the ignition switch 50A and the shift position information of the shift lever 50B from the travel control unit 48.

The vehicle state acquisition unit 12A acquires the vehicle speed, the degree of acceleration, the steering angle information, the operation information of the ignition switch 50A, and the shift position information as the information indicative of the vehicle state.

The wave transmission control unit 12B sets, as a top of a wave transmission order, one of the distance measurement sensors 20 whose detection range covers a region where an object B is located. This object B has been detected through preliminary detection when power supply to the vehicle 1 is started. Then, the wave transmission control unit 12B repeats cyclic wave transmission control on the distance measurement sensors 20 to respectively emit ultrasonic waves sequentially in the wave transmission order described above.

The preliminary detection means processing of detecting the object B before the cyclic wave transmission control is performed. The details of the cyclic wave transmission control will be described later.

The wave transmission control unit 12B performs the preliminary detection at least when power supply to the vehicle 1 is started. In the present embodiment, the wave transmission control unit 12B performs the preliminary detection when an execution condition representing that power supply to the vehicle 1 is started and the vehicle state of the vehicle 1 indicates a predetermined state is satisfied.

An execution condition refers to a condition for executing the preliminary detection. The wave transmission control unit 12B determines whether an execution condition is satisfied, by using information indicative of the vehicle state, which the vehicle state acquisition unit 12A has acquired.

More specifically, the wave transmission control unit 12B determines whether the operation information of the ignition switch 50A, which is included in the information indicative of the vehicle state, which the vehicle state acquisition unit 12A has acquired, corresponds to information indicative of a power supply instruction to each part of the electrical system of the vehicle 1. When the information indicative of the power supply instruction is included, the wave transmission control unit 12B determines that an execution condition is satisfied. For example, the wave transmission control unit 12B determines that an execution condition is satisfied when power supply to the vehicle 1 is started.

Note that the wave transmission control unit 12B may determine whether the operation information of the ignition switch 50A, which is included in the information indicative of the vehicle state, which the vehicle state acquisition unit 12A has acquired, includes information indicative of an engine start instruction to the vehicle 1. The wave transmission control unit 12B may determine that an execution condition is satisfied when the information indicative of the vehicle state includes information indicative of an engine start instruction to the vehicle 1.

The wave transmission control unit 12B determines that an execution condition is satisfied when the shift position information of the shift lever 50B, which is included in the information indicative of the vehicle state, which the vehicle state acquisition unit 12A has acquired, indicates information that differs from the shift position information acquired previously. For example, the wave transmission control unit 12B determines that an execution condition is satisfied when the user has provided an operation instruction, the shift lever 50B has been operated, and the shift position has been changed.

Note that the wave transmission control unit 12B may determine that an execution condition is satisfied when at least one of the vehicle speed of the vehicle 1, the degree of acceleration of the vehicle 1, and the steering angle information satisfies a predetermined condition that has been determined in advance.

Upon determination that the vehicle state of the vehicle 1 satisfies an execution condition, the wave transmission control unit 12B executes the preliminary detection for the object B.

In the present embodiment, the wave transmission control unit 12B detects the object B through the preliminary detection by performing full wave transmission control on the distance measurement sensors 20 to emit ultrasonic waves.

The full wave transmission control refers to a control on the distance measurement sensors 20 mounted on the vehicle 1 to emit ultrasonic waves. The distance measurement sensors 20 that are subject to the full wave transmission control may be all the distance measurement sensors 20 mounted on the vehicle 1, or may be the distance measurement sensors 20 belonging to a predetermined group.

For example, in the object detection device 10, the distance measurement sensors 20 belonging to a group corresponding to an execution condition are set in advance. Then, upon determination that an execution condition is satisfied, the wave transmission control unit 12B detects the object B through the preliminary detection by performing the full wave transmission control on all the distance measurement sensors 20 belonging to a group corresponding to the determined execution condition to emit ultrasonic waves.

The object detection device 10 stores, in the storage unit 54, an execution condition and identification information of the distance measurement sensors 20 belonging to a group corresponding to the execution condition in an associated manner.

Specifically, for example, the storage unit 54 stores in advance the execution condition of "start of power supply to the vehicle 1" and the identification information of the distance measurement sensor 20FL, the distance measurement sensor 20FLC, the distance measurement sensor 20FRC, and the distance measurement sensor 20FR respectively provided on the front portion of the vehicle 1 in an associated manner. Moreover, the storage unit 54 stores the execution condition of "shift position information "reverse (R)"" and the identification information of the distance measurement sensor 20RL, the distance measurement sensor 20RLC, the distance measurement sensor 20RRC, and the distance measurement sensor 20RR respectively provided on the rear portion of the vehicle 1 in an associated manner. Furthermore, the storage unit 54 stores the execution condition of "shift position information "forward driving (D)"" and the identification information of the distance measurement sensor 20FL, the distance measurement sensor 20FLC, the distance measurement sensor 20FRC, and the distance measurement sensor 20FR respectively provided on the front portion of the vehicle 1 in an associated manner.

The wave transmission control unit 12B reads out, from the storage unit 54, the identification information of the distance measurement sensors 20 corresponding to a determined execution condition, and identifies the distance measurement sensors 20 belonging to a group corresponding to the determined execution condition. Then, the wave transmission control unit 12B performs the full wave transmission control on the identified distance measurement sensors 20 to emit ultrasonic waves.

Note that the distance measurement sensors 20 belonging to a group corresponding to an execution condition are not limited to those described in the above embodiment. In the present embodiment, the identification information of the distance measurement sensors 20 belonging to a group corresponding to an execution condition is described as an example in the form that the identification information is stored in the storage unit 54 in an associated manner.

With the full wave transmission control on the distance measurement sensors 20 to emit ultrasonic waves, the object B is detected through the preliminary detection.

More specifically, the detection result acquisition unit 12C acquires detection result information from each of the distance measurement sensors 20. As described above, the detection result information includes object detection information indicative of object detection and distance information indicative of a distance to an object. Note that, when no object is detected, it is sufficient that the distance measurement sensors 20 output, to the object detection device 10, detection result information including information representing that no object has been detected.

The object detection unit 12D calculates a position of the object B by using the detection result information acquired from each of the distance measurement sensors 20. The object detection unit 12D outputs the detection result information acquired from the detection result acquisition unit 12C, information indicative of the position of the object B, and the identification information of the distance measurement sensors 20 that have transmitted the detection result information to the wave transmission control unit 12B and the determination unit 12E.

The wave transmission control unit 12B determines the distance measurement sensor 20, which is identified by the identification information of the distance measurement sensor 20 as a transmission source of the detection result information including the object detection information indicative of object detection, as the distance measurement sensor 20 whose detection range 30 covers a region where the object B detected through the preliminary detection is located.

The wave transmission control unit 12B repeats the cyclic wave transmission control starting from, as the top of the wave transmission order, one of the distance measurement sensors 20 whose detection range 30 covers the region where the object B detected through the preliminary detection is located.

Repetition of the cyclic wave transmission control refers to cyclically and repeatedly executing a series of wave transmission control on the distance measurement sensors 20 to respectively emit ultrasonic waves sequentially in a predetermined wave transmission order.

The wave transmission control unit 12B sets the distance measurement sensor 20, which has detected the object B through the preliminary detection, as the distance measurement sensor 20 serving as the top of the wave transmission order to emit ultrasonic waves in each cycle under the cyclic wave transmission control. Then, the wave transmission control unit 12B repeats the cyclic wave transmission control C starting from the distance measurement sensor 20 as the top of the wave transmission order.

The determination unit 12E is configured to determine the object B as a detection target object when any one of the distance measurement sensors 20 has detected this object B a predetermined number of times. Determination of an object as a detection target object means that, for example, the object B that one of the distance measurement sensor 20 has detected is determined as the object B to be detected for use in post-processing by the drive control unit 12F.

It is sufficient that the predetermined number of times applied for determining the object B as a detection target object is determined in advance. In the present embodiment, it is described, as an example, a case where the predetermined number of times is three times. Note that it is sufficient that the predetermined number of times is plural times, and is not limited to three times. Furthermore, the "predetermined number of times" expressed in the present embodiment is described to mean the number of times applied for determining the object B as a detection target object.

FIGS. 6A and 6B are explanatory diagrams of an example of the wave transmission control according to the present embodiment. In FIGS. 6A and 6B and the explanatory diagrams of the wave transmission control described later, a situation is illustrated, in which the shift position information of the shift lever 50B satisfies the execution condition representing "reverse (R)" unless otherwise specifically described. Furthermore, in FIGS. 6A and 6B and the explanatory diagrams of the wave transmission control described later, the wave transmission control is performed on the distance measurement sensors 20 belonging to a group corresponding to the execution condition representing "reverse (R)", namely, performed on the distance measurement sensor 20RL, the distance measurement sensor 20RLC, the distance measurement sensor 20RRC, and the distance measurement sensor 20RR, which are provided at the rear portion of the vehicle 1. FIGS. 6A and 6B illustrate, as an example, a situation when the object B is present in the detection range 30RL of the distance measurement sensor 20RL. In FIG. 6B, the horizontal axis indicates the time t.

When the shift position information of the shift lever 50B satisfies the execution condition representing "reverse (R)", the wave transmission control unit 12B performs the full wave transmission control F on the distance measurement sensor 20RL, the distance measurement sensor 20RLC, the distance measurement sensor 20RRC, and the distance measurement sensor 20RR such that these distance measurement sensors 20 respectively emit ultrasonic waves (Step S10 in FIG. 6A).

Under the full wave transmission control F that the wave transmission control unit 12B performs, the distance measurement sensor 20RL, the distance measurement sensor 20RLC, the distance measurement sensor 20RRC, and the distance measurement sensor 20RR respectively emit ultrasonic waves. As illustrated in FIG. 6B, under the full wave transmission control F, the distance measurement sensor 20RL, the distance measurement sensor 20RLC, the distance measurement sensor 20RRC, and the distance measurement sensor 20RR respectively emit ultrasonic waves simultaneously at the same timing and for the same wave transmission period.

In the example illustrated in FIGS. 6A and 6B, the distance measurement sensor 20RL detects the object B through the preliminary detection under the full wave transmission control F. Therefore, the wave transmission control unit 12B sets the distance measurement sensor 20RL, which has detected the object B through the preliminary detection, as the distance measurement sensor 20 to be controlled to emit ultrasonic waves as the top of the wave transmission order for each cycle under the cyclic wave transmission control C.

Then, the wave transmission control unit 12B repeats the cyclic wave transmission control C on the distance measurement sensor 20RL, the distance measurement sensor 20RLC, the distance measurement sensor 20RRC, and the distance measurement sensor 20RR, which belong to a group corresponding to the execution condition representing that the shift position information of the shift lever 50B indicates "reverse (R)". In the cyclic wave transmission control C, those distance measurement sensors 20 respectively emit ultrasonic waves sequentially in the predetermined wave transmission order starting from the distance measurement sensor 20RLC that has detected the object B through the preliminary detection.

It is assumed in here that the wave transmission order is predetermined as, for example, the order of the distance measurement sensor 20RLC, the distance measurement sensor 20RRC, the distance measurement sensor 20RL, and the distance measurement sensor 20RR. In this case, the wave transmission control unit 12B repeats the cyclic wave transmission control C on the distance measurement sensor 20RL and the distance measurement sensor 20RR, the distance measurement sensor 20RLC, and the distance measurement sensor 20RRC to respectively emit ultrasonic waves sequentially in this order starting from, as the top of the order, the distance measurement sensor 20RL that has detected the object B through the preliminary detection (Step S11 to Step S13 in FIG. 6A).

By the repetition of the cyclic wave transmission control C, as illustrated in FIG. 6B, the distance measurement sensor 20RL and the distance measurement sensor 20RR respectively emit ultrasonic waves at the beginning of each of the first cycle C1, the second cycle C2, and the third cycle C3 under the cyclic wave transmission control C. As described above, in the present embodiment, it is described, as an example, a case where the predetermined number of times is three times. Accordingly, when the distance measurement sensor 20RL and the distance measurement sensor 20RR have respectively emitted ultrasonic waves at the wave transmission timing at the beginning of the third cycle C3, the determination unit 12E determines, as a detection target object, the object B that has been present in the detection range 30RL detected by the emitted ultrasonic waves.

Therefore, the object detection device 10 according to the present embodiment is able to determine, as a detection target object, the object B that the distance measurement sensor 20RL has detected a predetermined number of times, without performing, by the distance measurement sensor 20RLC and distance measurement sensor 20RRC, unnecessary wave transmissions X in the first cycle C1, which may be found in the control in the conventional technology described with reference to FIGS. 5A and 5B. In other words, the object detection device 10 according to the present embodiment does not perform the unnecessary two wave transmissions X, which may be found in the control in the conventional technology described with reference to FIGS. 5A and 5B, but is able to determine, as a detection target object, the object B that has been present in the detection range 30RL of the distance measurement sensor 20RL. When a period of the full wave transmission control F corresponds to one wave transmission time for one wave transmission of emitting ultrasonic waves, the object detection device 10 according to the present embodiment makes it possible to shorten the time required for one wave transmission.

In the cyclic wave transmission control C, the object detection device 10 according to the present embodiment gives priority to the detection range 30 from which the object B has been detected through the preliminary detection under the full wave transmission control F. Therefore, the object detection device 10 makes it possible to shorten the time required to determine the object B as a detection target object. Moreover, the object detection device 10 determines the object B detected a predetermined number of times as a detection target object, making it possible to suppress erroneous determinations, but to highly accurately determine the object B as the detection target object.

Now back to FIG. 3 to continue the description. The drive control unit 12F is configured to perform drive control for the vehicle 1 on the basis of a result of determination by the determination unit 12E.

For example, the drive control unit 12F controls the travel control unit 48 to avoid a collision with the object B that the determination unit 12E has determined as a detection target object. For example, the drive control unit 12F controls the travel control unit 48 to keep traveling while avoiding a collision with the object B that has been determined as a detection target object. In this case, the travel control unit 48 controls the vehicle 1 to keep traveling while avoiding a collision with the object B that has been determined as the detection target object. Moreover, the drive control unit 12F controls the travel control unit 48 to stop the vehicle in order to avoid a collision with the object B that has been determined as a detection target object. In this case, the travel control unit 48 controls the vehicle 1 to stop traveling in order to avoid a collision with the object B that has been determined as the detection target object.

The drive control unit 12F may output, to the meter computer 52, information relative to the object B that the determination unit 12E has determined as the detection target object. For example, the drive control unit 12F may display, on the meter computer 52, information indicating that the object B is present in the determined one of the detection ranges 30, or may output it as a voice sound.

Note that there may be a case that two or more objects B are detected through the preliminary detection. In this case, it is sufficient that the wave transmission control unit 12B repeats the cyclic wave transmission control C starting from, as the top of the wave transmission order, the distance measurement sensor 20 whose detection range 30 covers a region where the object B, which is present at the closest distance to the vehicle 1, is located.

FIG. 7 illustrates an example of the wave transmission control when the objects B are detected through the preliminary detection. FIG. 7 illustrates, as an example, a situation where the objects B (objects B1 to B4) are respectively present in the detection range 30RL of the distance measurement sensor 20RL, the detection range 30RLC of the distance measurement sensor 20RLC, the detection range 30RRC of the distance measurement sensor 20RRC, and the detection range 30RR of the distance measurement sensor 20RR.

The wave transmission control unit 12B performs the full wave transmission control F on the distance measurement sensor 20RL, the distance measurement sensor 20RLC, the distance measurement sensor 20RRC, and the distance measurement sensor 20RR to respectively emit ultrasonic waves from these distance measurement sensors 20 (Step S14).

Under the full wave transmission control F at Step S14, the distance measurement sensor 20RL, the distance measurement sensor 20RLC, the distance measurement sensor 20RRC, and the distance measurement sensor 20RR respectively detect the objects B. As described above, there may be a case where the distance measurement sensors 20 respectively detect the objects B through the preliminary detection.

In this case, the wave transmission control unit 12B identifies the object B that is present at the closest distance to the vehicle 1, out of the objects B detected through the preliminary detection. For example, the wave transmission control unit 12B identifies the object B that is present at the closest distance represented by the distance information included in the detection result information received from the object detection unit 12D. In the example illustrated in FIG. 7, the wave transmission control unit 12B identifies the object B2 as the object B that is present at the closest distance to the vehicle 1. Then, the wave transmission control unit 12B sets the distance measurement sensor 20RLC, which has detected the object B2, as the distance measurement sensor 20 that is controlled to emit ultrasonic wave as the top of the wave transmission order for each cycle under the cyclic wave transmission control C. For example, the wave transmission control unit 12B sets the distance measurement sensor 20RLC, which has detected the object B2 present at the closest distance to the vehicle 1 through the preliminary detection, as the distance measurement sensor 20 that is controlled to emit ultrasonic wave at the beginning of each cycle under the cyclic wave transmission control C.

Then, the wave transmission control unit 12B repeats the cyclic wave transmission control C on the distance measurement sensor 20RL, the distance measurement sensor 20RLC, the distance measurement sensor 20RRC, and the distance measurement sensor 20RR to respectively emit ultrasonic waves sequentially in the predetermined wave transmission order starting from the distance measurement sensor 20RLC as the top of this order (Step S15 to Step S17).

As described above, when two or more of the distance measurement sensors 20 have detected the objects B through the preliminary detection, the wave transmission control unit 12B repeats the cyclic wave transmission control C starting from, as the top of the wave transmission order, one of the distance measurement sensors 20 whose detection range 30 covers a region where the object B present at the closest distance to the vehicle 1 is located. Therefore, in this case, the object detection device 10 is able to determine more preferentially, as a detection target object, the object B that is present at the closest distance to the vehicle 1.

Note that the wave transmission control unit 12B may repeat the cyclic wave transmission control C after performing control on the distance measurement sensor 20, whose detection ranges 30 covers a region where the object B detected through the preliminary detection under the full wave transmission control F is located, to perform wave transmissions a predetermined number of times. In other words, the wave transmission control unit 12B may repeat the cyclic wave transmission control C after controlling the above-noted distance measurement sensor 20 to perform wave transmissions the number of times that is the same as the predetermined number of times used for determining the object B as a detection target object.

FIG. 8 is an explanatory diagram of an example of the wave transmission control. FIG. 8 illustrates a case where the distance measurement sensor 20RL detects the object B through the preliminary detection under the full wave transmission control F. FIG. 8 also illustrates the flow of the wave transmission control when performing control on the distance measurement sensor 20RL to perform wave transmissions the predetermined number of times, and then repeating the cyclic wave transmission control C. In FIG. 8, the horizontal axis indicates the time t.

Under the full wave transmission control F that the wave transmission control unit 12B performs, the distance measurement sensor 20RLC, the distance measurement sensor 20RRC, the distance measurement sensor 20RL, and the distance measurement sensor 20RR respectively emit ultrasonic waves. Here, it is assumed that the distance measurement sensor 20RL has detected the object B through the preliminary detection under the full wave transmission control F. In this case, the wave transmission control unit 12B sets, as the top of the wave transmission order, the distance measurement sensor 20RL that has detected the object B through the preliminary detection, and controls the distance measurement sensor 20RL and the distance measurement sensor 20RR to respectively emit ultrasonic waves sequentially a predetermined number of times each (for example, three times). Then, the wave transmission control unit 12B repeats the cyclic wave transmission control C starting from, as the top of the wave transmission order, the distance measurement sensor 20RL that has detected the object B through the preliminary detection.

As described above, the wave transmission control unit 12B may repeat the cyclic wave transmission control C starting from, as the top of the wave transmission order, the distance measurement sensor 20RL, which has detected the object B through the preliminary detection, after controlling this distance measurement sensor 20RL to emit ultrasonic waves sequentially a predetermined number of times at the beginning of the first cycle C1 under the cyclic wave transmission control C. In this case, the object detection device 10 makes it possible to further shorten the time required to determine the object B as a detection target object.

Note that, when any one of the distance measurement sensors 20 has detected the object B a predetermined number of times under the cyclic wave transmission control C, the determination unit 12E determines the object B as a detection target object. For example, the determination unit 12E determines, as the distance measurement sensor 20 that has detected a detection target object, the distance measurement sensor 20 that has detected the object B a predetermined number of times through the repetition of the cyclic wave transmission control C. Then, the determination unit 12E determines, as a detection target object, the object B that the distance measurement sensor 20 has detected.

It is considered in here that, when one of the distance measurement sensors 20 has detected the object B under the full wave transmission control F by the wave transmission control unit 12B, there will be no interference of reflected waves even when the distance measurement sensors 20 respectively emit ultrasonic waves simultaneously under the full wave transmission control F. Therefore, when one of the distance measurement sensors 20 has detected the object B under the full wave transmission control F, the determination unit 12E may increment the predetermined number of times by one that corresponds to the detection number of times of the object B that has been detected under the full wave transmission control F. For example, when any one of the distance measurement sensors 20 has detected the object B a predetermined number of times under the full wave transmission control F and the cyclic wave transmission control C, the determination unit 12E may determine the object B as a detection target object.

Figure 9:
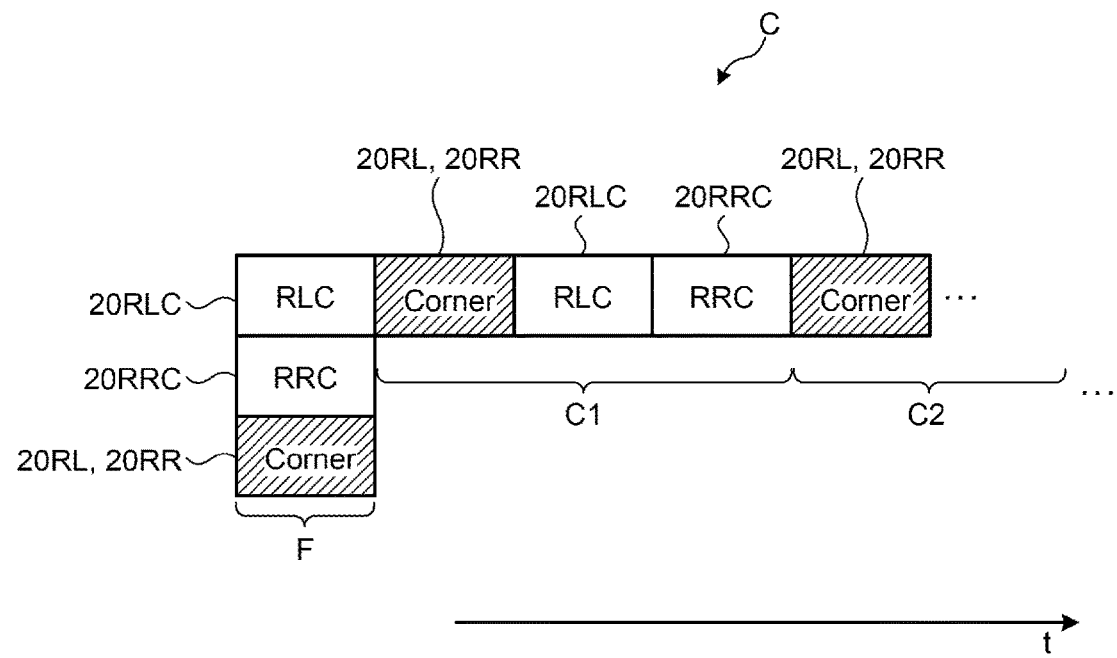
FIG. 9 is an explanatory diagram illustrating an example of the wave transmission control according to the embodiment.

FIG. 9 is an explanatory diagram of an example of wave control when a detection number of times of the object B under the full wave transmission control F is counted to increment a predetermined number of times. In FIG. 9, the horizontal axis represents the time t.

Under the full wave transmission control F that the wave transmission control unit 12B performs, the distance measurement sensor 20RLC, the distance measurement sensor 20RRC, the distance measurement sensor 20RL, and the distance measurement sensor 20RR respectively emit ultrasonic waves. It is assumed in here that the distance measurement sensor 20RL has detected the object B through the preliminary detection under the full wave transmission control F. In this case, the wave transmission control unit 12B repeats the cyclic wave transmission control C starting from the top of the wave transmission order, namely, the distance measurement sensor 20RL which has detected the object B through the preliminary detection.

Then, when a sum total of a count (that is "one") at which the distance measurement sensor 20RL has detected the object B under the full wave transmission control F and a count at which the distance measurement sensor 20RL has detected the object B under the cyclic wave transmission control C reaches a predetermined number of times, the determination unit 12E determines the object B as a detection target object.

As described above, when any one of the distance measurement sensors 20 has detected the object B a predetermined number of times under the full wave transmission control F and the cyclic wave transmission control C, the determination unit 12E may determine the object B as a detection target object. By counting a detection number of times including a count at which the object B is detected under the full wave transmission control F, the object detection device 10 makes it possible to further shorten the time required to determine the object B as a detection target object.

Note that the wave transmission control unit 12B may detect the object B through the preliminary detection by using object detection sensors other than the distance measurement sensors 20. The other object detection sensors may be, for example, at least one of the imaging devices 40 and the radars 42. In this case, for example, it is sufficient that the wave transmission control unit 12B detects, when an execution condition is satisfied, such as when power supply to the vehicle 1 is started, at least either the object B present in an image captured by one of the imaging devices 40 or the object B detected by one of the radars 42 to detect the object B through the preliminary detection.

Then, it is sufficient that the wave transmission control unit 12B repeats the cyclic wave transmission control C starting from, as the top of the wave transmission order, the distance measurement sensor 20 that has detected the object B through the preliminary detection.

Figure 10:
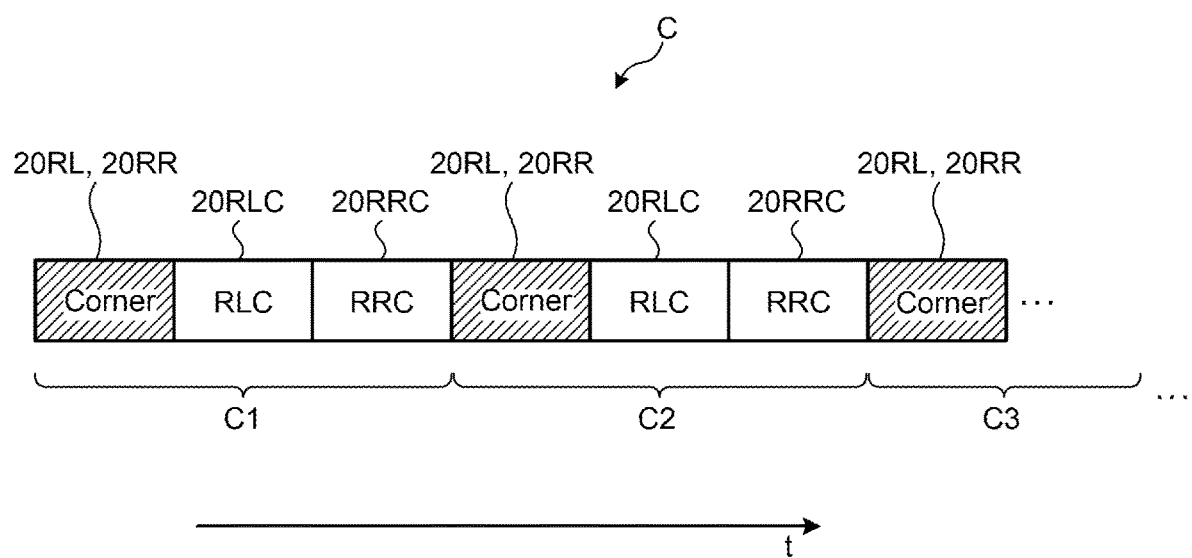
FIG. 10 is an explanatory diagram illustrating an example of the wave transmission control according to the embodiment.

FIG. 10 is an explanatory diagram of an example of the transmission control when one of the object detection sensors has detected the object B through the preliminary detection. In FIG. 10, the horizontal axis indicates the time t.

It is assumed in here that the object detection sensors such as the imaging devices 40 have detected, through the preliminary detection, the object B that is present in the detection range 30RL of the distance measurement sensor 20RL. In this case, it is sufficient that the wave transmission control unit 12B repeats the cyclic wave transmission control C starting from, as the top of the wave transmission order, the distance measurement sensor 20RL whose detection range 30RL covers a region where the object B having been detected through the preliminary detection is located.

Also in the case that object detection sensors other than the distance measurement sensors 20 are used to perform the preliminary detection, it is possible to shorten the time required to determine the object B as a detection target object, by repeating the cyclic wave transmission control C starting from, as the top of the wave transmission order, the distance measurement sensor 20RL whose detection range 30RL covers the region where the object B having been detected through the preliminary detection is located.

Note that, as described above with reference to FIG. 6B, FIG. 8, and FIG. 9, the wave transmission control unit 12B may perform control on the distance measurement sensors 20 to respectively emit ultrasonic waves simultaneously under the full wave transmission control F. The wave transmission control unit 12B may control, in the full wave transmission control F, the distance measurement sensors 20 to respectively emit ultrasonic waves sequentially at timings that do not at least partially overlap with each other.

Figure 11:
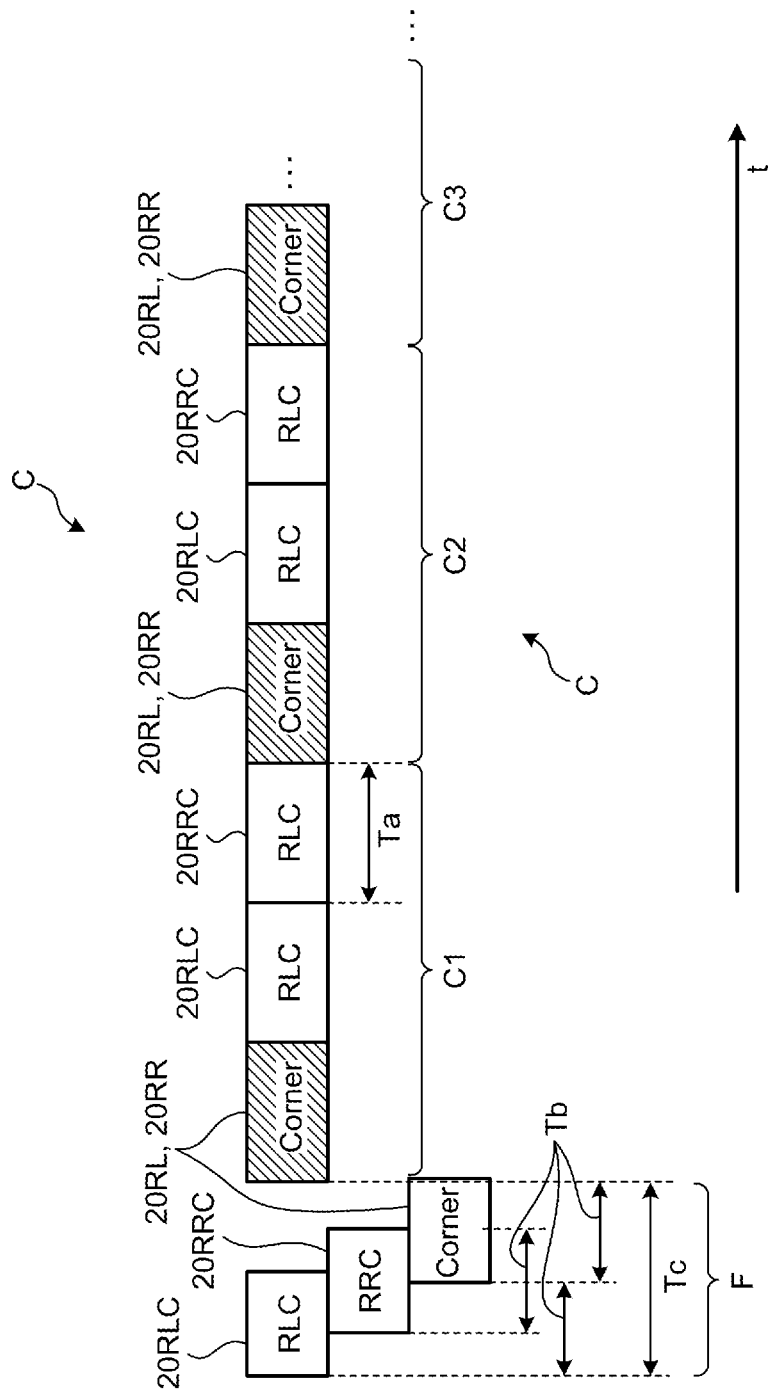
FIG. 11 is an explanatory diagram illustrating an example of the wave transmission control according to the embodiment.

FIG. 11 is an explanatory diagram of an example of the flow of the wave transmission control that the wave transmission control unit 12B performs. In FIG. 11, the horizontal axis indicates the time t.

The wave transmission control unit 12B causes, under the full wave transmission control F, the distance measurement sensor 20RLC, the distance measurement sensor 20RRC, the distance measurement sensor 20RL, and the distance measurement sensor 20RR to respectively emit ultrasonic waves.

The wave transmission control unit 12B may cause, under the full wave transmission control F, the distance measurement sensors 20 to respectively emit ultrasonic waves sequentially at timings that do not at least partially overlap with each other. In this case, it is preferable that the wave transmission control unit 12B performs the full wave transmission control F on the distance measurement sensors 20 to respectively emit ultrasonic waves in a wave transmission time Tb that is shorter than a wave transmission time Ta per one emission of ultrasonic waves from each of the distance measurement sensors 20 under the cyclic wave transmission control C. In this case, it is also preferable that wave transmission periods of the distance measurement sensors 20 are partially overlap with each other.

Moreover, it is preferable that a total wave transmission period Tc for which the distance measurement sensors 20 emit ultrasonic waves under the full wave transmission control F is shorter than twice of the wave transmission time Ta per one emission of ultrasonic waves from each of the distance measurement sensors 20 under the cyclic wave transmission control C.

Making the wave transmission time Tb for which the distance measurement sensors 20 emit ultrasonic waves under the full wave transmission control F to be shorter than the wave transmission time Ta for which each of the distance measurement sensors 20 emits ultrasonic waves once under the cyclic wave transmission control C makes it possible to shorten the time for which the full wave transmission control F is to be performed. Therefore, in this case, the object detection device 10 is able to shorten the time required to determine the object B as a detection target object.

Note that the wave transmission control unit 12B may control the distance measurement sensors 20 provided in the vehicle 1 to respectively emit ultrasonic waves at different frequencies. The different frequencies differ from one another among predetermined groups into which the distance measurement sensors 20 are classified.

The groups, whose frequencies for emission differ from each other, may be the same as or different from the groups each corresponding to an execution condition described above. In the present embodiment, the groups, whose frequencies for emission differ from each other, are described as that, they are the same as the groups each corresponding to an execution condition described above.

The wave transmission control unit 12B sets in advance frequencies that are different for each group to which the distance measurement sensors 20 respectively belong.

For example, the wave transmission control unit 12B classifies in advance the distance measurement sensors 20 provided in the vehicle 1 into a group of the distance measurement sensor 20FL, the distance measurement sensor 20FLC, the distance measurement sensor 20FRC, and the distance measurement sensor 20FR, which are provided on the front portion of the vehicle 1, and a group of the distance measurement sensor 20RL, the distance measurement sensor 20RLC, the distance measurement sensor 20RRC, and the distance measurement sensor 20RR, which are provided on the rear portion of the vehicle 1. Then, the wave transmission control unit 12B applies in advance, to the distance measurement sensors 20 respectively belonging the groups, ultrasonic waves at frequencies differing from each other.

Then, under each of the full wave transmission control F and the cyclic wave transmission control C described above, the wave transmission control unit 12B performs control on the groups to respectively emit ultrasonic waves at frequencies that differ from each other.

FIG. 12 is an explanatory diagram of an example of the vehicles 1, each equipped with the object detection device 10 according to the present embodiment. FIG. 12 illustrates, as an example, a vehicle 1A and a vehicle 1B traveling forward in an advancing direction (a direction indicated by an arrow Z). The vehicle 1A and the vehicle 1B are each an example of the vehicle 1.

For example, it is assumed in here that, while the vehicle 1A and the vehicle 1B are traveling forward in the direction indicated by the arrow Z, all the distance measurement sensors 20 provided in those vehicles 1 respectively emit ultrasonic waves. Even in this case, the wave transmission control unit 12B controls the distance measurement sensors 20 to respectively emit ultrasonic waves at frequencies differ from each other among the groups, and thus it is possible to suppress interference that may occur when ultrasonic waves that the vehicles 1 have respectively emitted are received.

Specifically, it is assumed in here that, for example, all the frequencies of ultrasonic waves that the distance measurement sensors 20 provided in the vehicles 1 respectively emit are the same. In this case, the frequency of the ultrasonic waves that the distance measurement sensors 20 (the distance measurement sensor 20RL, the distance measurement sensor 20RLC, the distance measurement sensor 20RRC, and the distance measurement sensor 20RR) provided on the rear portion of vehicle 1A emit and the frequency of the ultrasonic waves that the distance measurement sensors 20 (the distance measurement sensor 20FL, the distance measurement sensor 20FLC, the distance measurement sensor 20FRC, and the distance measurement sensor 20FR) provided on the front portion of vehicle 1B emit are the same as each other, possibly leading to interference.

On the other hand, in the present embodiment, the wave transmission control unit 12B performs control on the distance measurement sensors 20 (the distance measurement sensor 20RL, the distance measurement sensor 20RLC, the distance measurement sensor 20RRC, and the distance measurement sensor 20RR) provided on the rear portion of each of the vehicles 1 and the distance measurement sensors 20 (the distance measurement sensor 20FL, the distance measurement sensor 20FLC, the distance measurement sensor 20FRC, and the distance measurement sensor 20FR) provided on the front portion of each of the vehicles 1 to respectively emit ultrasonic waves at frequencies that differ from each other. With this control, the frequency of the ultrasonic waves that the distance measurement sensors 20 (the distance measurement sensor 20RL, the distance measurement sensor 20RLC, the distance measurement sensor 20RRC, and the distance measurement sensor 20RR) provided on the rear portion of the vehicle 1A emit and the frequency of the ultrasonic waves that the distance measurement sensors 20 (the distance measurement sensor 20FL, the distance measurement sensor 20FLC, the distance measurement sensor 20FRC, and the distance measurement sensor 20FR) provided on the front portion of the vehicle 1B emit differ from each other, suppressing interference.

Therefore, according to the present embodiment, even when, for example, the wave transmission control unit 12B performs the full wave transmission control F and the cyclic wave transmission control C by using all the distance measurement sensors 20 mounted on each of the vehicles 1, regardless of the shift position information of each of the vehicles 1, it is possible to suppress an event that the ultrasonic waves that the vehicles 1 that differ from each other emit interfere with each other. Therefore, the object detection system 100 is able to cause all the distance measurement sensors 20 mounted on each of the vehicles 1 to always emit ultrasonic waves, making it possible to improve responsiveness.

Next, an example of the flow of information processing that the object detection device 10 according to the present embodiment executes will now be described.

Figure 13:
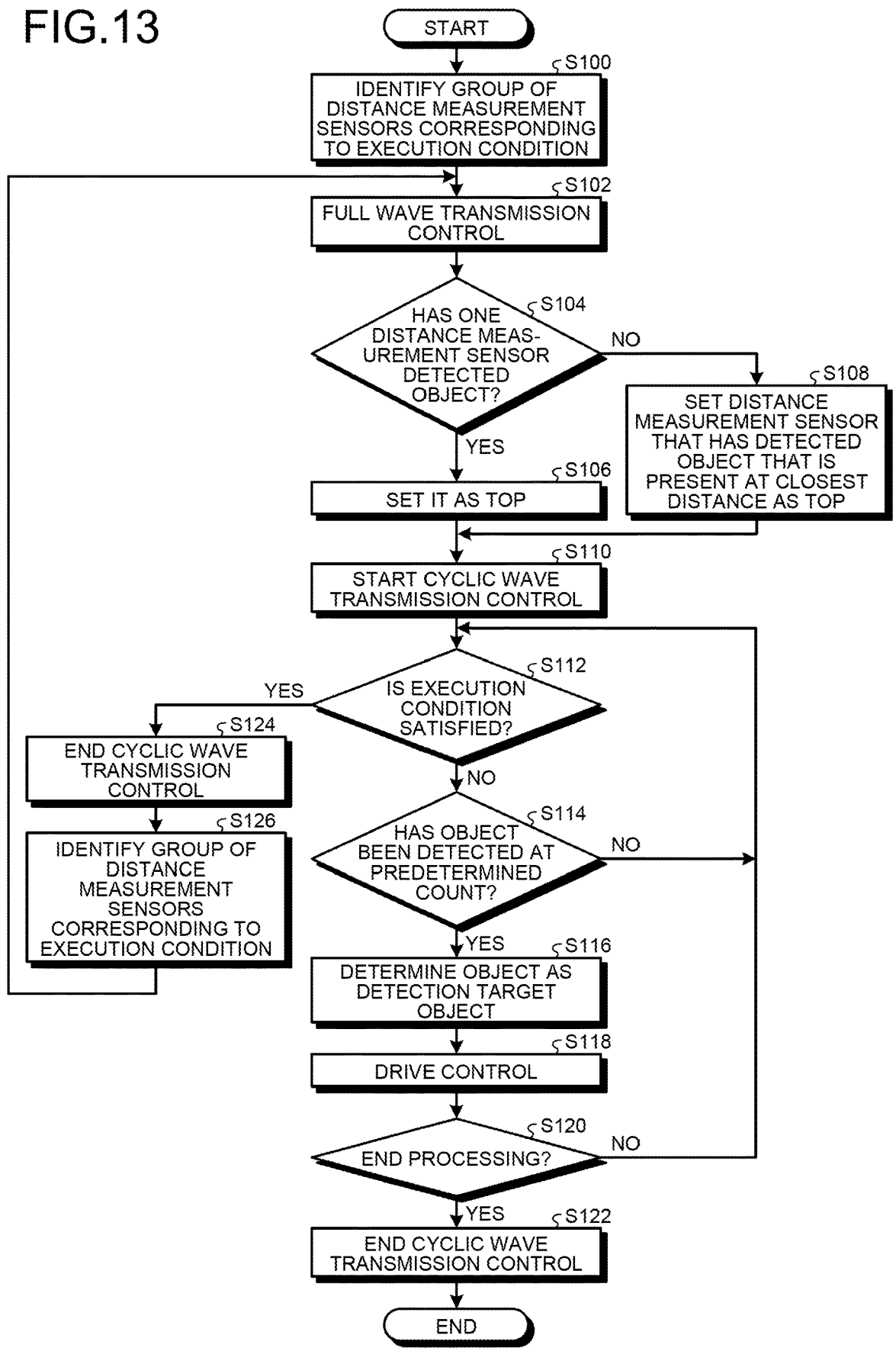
FIG. 13 is a flowchart illustrating an example of the flow of information processing according to the embodiment.

FIG. 13 is a flowchart illustrating an example of the flow of the information processing that the object detection device 10 executes. Note that FIG. 13 illustrates an example of the flow of the information processing executed when the user operates the ignition switch 50A of the vehicle 1 and the power supply to the vehicle 1 is started.

When the power supply to the vehicle 1 is started, the wave transmission control unit 12B identifies a group of the distance measurement sensors 20, which corresponds to the execution condition of "start of power supply to the vehicle 1" (Step S100). For example, the wave transmission control unit 12B identifies, as the distance measurement sensors 20 which correspond to the execution condition of "start of power supply to the vehicle 1", the distance measurement sensor 20FL, the distance measurement sensor 20FLC, the distance measurement sensor 20FRC, and the distance measurement sensor 20FR provided on the front portion of the vehicle 1.

Next, the wave transmission control unit 12B detects the object B through the preliminary detection by performing the full wave transmission control F on all the distance measurement sensors 20, which belong to the identified group, to emit ultrasonic waves (Step S102).

The wave transmission control unit 12B determines whether one of the distance measurement sensors 20 has detected the object B under the full wave transmitter control F at Step S102 (Step S104). When one of the distance measurement sensors 20 has detected the object B (Yes at Step S104), the flow proceeds to Step S106.

At Step S106, the wave transmission control unit 12B sets the distance measurement sensor 20 that has detected the object B through the preliminary detection under the full wave transmission control F at Step S102 as the distance measurement sensor 20 that is controlled to emit ultrasonic waves as the top of the wave transmission order for each cycle under the cyclic wave transmission control C (Step S106). Then, the flow proceeds to Step S110.

On the other hand, when two or more of the distance measurement sensors 20 have detected the objects B under the full wave transmission control F at Step S102 (No at Step S104), the flow proceeds to Step S108. At Step S108, the wave transmission control unit 12B sets one of the two or more of the distance measurement sensors 20, which has detected the object B that is present at the closest distance to the vehicle 1, as the distance measurement sensor 20 that is controlled to emit ultrasonic waves as the top of the wave transmission order for each cycle under the cyclic wave transmission control C (Step S108). Then, the flow proceeds to Step S110.

At Step S110, the wave transmission control unit 12B starts the cyclic wave transmission control C on the distance measurement sensors 20, which belong to the group corresponding to the execution condition, to emit ultrasonic waves sequentially in the wave transmission order from the distance measurement sensor 20 that has been set as the top of the wave transmission order at Step S106 or Step S108 (Step S110).

Next, the wave transmission control unit 12B determines whether an execution condition is satisfied (Step S112). At Step S112, the wave transmission control unit 12B determines whether a vehicle state that the vehicle state acquisition unit 12A has acquired satisfies another execution condition, which differs from the execution condition that has been used for the determination for the full wave transmission control F in the previous step, for example, Step S102.

When negative determination is made at Step S112 (No at Step S112), the flow proceeds to Step S114.

At Step S114, the determination unit 12E determines whether any one of the distance measurement sensors 20 has detected the object B a predetermined number of times (Step S114). When negative determination is made at Step S114 (No at Step S114), the flow returns to Step S112 described above and continues the cyclic wave transmission control C. When affirmative determination is made at Step S114 (Yes at Step S114), the flow proceeds to Step S116.

At Step S116, the object B that is present in the detection range 30 of the distance measurement sensor 20 that has detected the object B the predetermined number of times at Step S114 is determined as a detection target object (Step S116).

The drive control unit 12F performs drive control for the vehicle 1 on the basis of the determination result acquired at Step S116 (Step S118).

Next, the processing unit 12 determines whether to end the processing of the wave transmission control for the distance measurement sensors 20 (Step S120). For example, the processing unit 12 determines whether the user has operated the ignition switch 50A to input a signal indicative of the end of power supply to the vehicle 1 to execute the determination at Step S120. When negative determination is made at Step S120 (No at Step S120), the flow returns to Step S112 described above. When affirmative determination is made at Step S120 (Yes at Step S120), the flow proceeds to Step S122.

At Step S122, the wave transmission control unit 12B ends the cyclic wave transmission control C (Step S122) to end this routine.

On the other hand, when affirmative determination is made at Step S112 (Yes at Step S112), the flow proceeds to Step S124. At Step S124, the wave transmission control unit 12B ends the cyclic wave transmission control C (Step S124). Then, the wave transmission control unit 12B identifies a group of the distance measurement sensors 20, which corresponds to the execution condition that has been determined at Step S112 (Step S126). The flow proceeds to Step S102 described above.

As described above, the object detection system 100 according to the present embodiment includes the distance measurement sensors 20, the wave transmission control unit 12B, and the determination unit 12E. The distance measurement sensors 20 each include the wave transmitter 22 configured to emit ultrasonic waves and the wave receiver 24 configured to receive reflected ultrasonic waves reflected at the object B. The distance measurement sensors 20 are each configured to detect the object B in accordance with the reflected ultrasonic waves. The distance measurement sensors 20 are provided at positions that differ from each other in the vehicle 1. The wave transmission control unit 12B is configured to set one of the distance measurement sensors 20 as a top of a wave transmission order. A detection range of the one of the distance measurement sensors 20 covers a region where the object B is located. This object B has been detected through preliminary detection when power supply to the vehicle 1 is started. The wave transmission control unit 12B is configured to repeat the cyclic wave transmission control C on the distance measurement sensors 20 to respectively emit ultrasonic waves sequentially in the wave transmission order. The determination unit 12E is configured to determine the object B as a detection target object when any one of the distance measurement sensors 20 has detected the object B a predetermined number of times.

In the conventional technology, it has been repeatedly performed cyclic wave transmission control on the distance measurement sensors 20 to emit ultrasonic waves sequentially in a wave transmission order from the same distance measurement sensor 20 as the top of the wave transmission order. Then, when one of the distance measurement sensors 20 detects the object B a predetermined number of times or more, the object B is determined as a detection target object. Thus, in the conventional technology, when the distance measurement sensors 20 detect the object B, which emit ultrasonic waves at timings other than the beginning of each cycle under cyclic wave transmission control, unnecessary wave transmissions X may occur, possibly extending the time required to determine the object B as a detection target object. Moreover, in one conventional technology, the number of times of performing determinations is reduced when an object is detected in an image that an infrared camera has captured, and thereby the time for detecting the object is shortened. However, in such a conventional technology described above, the number of times of performing determinations is varied, which possibly leads to an erroneous determination, sometimes making it difficult to highly accurately determine the object B as the detection target object.

On the other hand, in the object detection system 100 according to the present embodiment, the wave transmission control unit 12B repeats the cyclic wave transmission control C on the distance measurement sensors 20 to respectively emit ultrasonic waves sequentially in a wave transmission order, after setting, as the top of the wave transmission order, one of the distance measurement sensor 20 whose detection range 30 covers a region where the object B is located, which has been detected through the preliminary detection when power supply to the vehicle 1 is started. Then, the determination unit 12E determines the object B as a detection target object when any one of the distance measurement sensors 20 has detected the object B a predetermined number of times.

In the object detection system 100 according to the present embodiment, the detection range 30, from which the object B has been detected through the preliminary detection, is given priority over the other detection ranges 30 of the distance measurement sensors 20 under the cyclic wave transmission control C. Therefore, the object detection device 10 according to the present embodiment makes it possible to shorten the time required to determine the object B as a detection target object. Moreover, the object detection device 10 determines the object B detected a predetermined number of times as a detection target object, making it possible to suppress erroneous determinations, but to highly accurately determine the object B as the detection target object.

Consequently, the object detection system 100 according to the present embodiment makes it possible to shorten the detection time and to achieve highly accurate object detection.

Additionally, the object detection system 100 according to the present embodiment detects the object B through the preliminary detection under the full wave transmission control F on the distance measurement sensors 20 to respectively emit ultrasonic waves. Therefore, the object detection system 100 according to the present embodiment makes it possible to achieve both the preliminary detection and the cyclic wave transmission control C by controlling the distance measurement sensors 20. In comparison with a case where various types of sensors are used for performing the preliminary detection and the cyclic wave transmission control C, the present embodiment makes it possible to provide the object detection system 100 with versatility, making it possible to deal with adjustments of sensor mounting positions and changes in specifications. Furthermore, the object detection system 100 according to the present embodiment makes it possible to reduce costs.

Note that, in the present embodiment, the object detection device 10 has been described as an example in the form of being mounted on the vehicle 1. However, the object detection device 10 may be mounted outside the vehicle 1. It is sufficient that the object detection device 10 is communicably connected to various electronic devices provided in the vehicle 1, such as the distance measurement sensors 20, the imaging devices 40, the radars 42, the G sensor 44, the steering angle sensor 46, the travel control unit 48, the meter computer 52, and the storage units 54. Therefore, the object detection device 10 may be mounted on an information processing device provided outside the vehicle 1. In this case, it is sufficient that the information processing device on which the object detection device 10 is mounted and the various electronic devices described above are configured to be communicably connected to each other via a network, for example.

With the object detection system, the object detection method and an object detection device according to the present disclosure, it is possible to shorten the time for detecting an object and to achieve highly accurate object detection.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

In the above description, the expressions "-er" and "-or" have been used to represent constituent elements. Instead of these expressions, other words such as "circuitry", "device", and "module" may be used to represent constituent elements.

The expression "unit" used in the above-described embodiments may be replaced with another expression such as "circuit (circuitry)", "device", or "module".

What is claimed is:

1. An object detection system comprising:
   a plurality of distance measurement sensors provided at different positions from each other in a vehicle, the plurality of distance measurement sensors each including a wave transmitter configured to emit ultrasonic waves and a wave receiver configured to receive reflected ultrasonic waves reflected at an object, each of the plurality of distance measurement sensors being configured to detect the object in accordance with the reflected ultrasonic waves;
   a hardware processor connected to a memory and configured to function as:
   a wave transmission control circuit serving to
      perform preliminary detection using the plurality of distance measurement sensors in response to a power supply to the vehicle being started,
      select one of the plurality of distance measurement sensors that has a detection range where the object is located in the preliminary detection,
      set a wave transmission order of the plurality of distance measurement sensors, the selected one of the plurality of distance measurement sensors set as a top of the wave transmission order, and
      repeat a cyclic wave transmission control on the plurality of distance measurement sensors, the plurality of distance measurement sensors emit ultrasonic waves sequentially in the wave transmission order in each cyclic wave transmission; and
   a determination circuit serving to determine the object as a detection target object in response to any one of the plurality of distance measurement sensors detecting the object a predetermined number of times,
   wherein the wave transmission control circuit serves to, in case two or more objects are detected through the preliminary detection, repeat the cyclic wave transmission control after setting, as the top of the wave transmission order, one of the plurality of distance measurement sensors that has a detection range where one of the two or more objects closest to the vehicle is located.

2. The object detection system according to claim 1, wherein the wave transmission control circuit serves to
   perform, when an execution condition is satisfied, full wave transmission control on two or more of the plurality of distance measurement sensors belonging to a predetermined group to emit ultrasonic waves, the execution condition being satisfied when power supply to the vehicle is started and a vehicle state of the vehicle indicates a predetermined state, and
   repeat the cyclic wave transmission control after setting, as the top of the wave transmission order, one of the two or more of the plurality of distance measurement sensors that has a detection range where the object having been detected through preliminary detection under the full wave transmission control is located.

3. The object detection system according to claim 2, wherein the wave transmission control circuit serves to
   perform, when the execution condition is satisfied, the full wave transmission control on the two or more of the plurality of distance measurement sensors belonging to the predetermined group to emit ultrasonic waves, the predetermined group corresponding to the execution condition, and
   repeat the cyclic wave transmission control on the two or more of the plurality of distance measurement sensors, which belong to the predetermined group corresponding to the execution condition, to emit ultrasonic waves sequentially in the wave transmission order after setting, as the top of the wave transmission order, one of the two or more of the plurality of distance measurement sensors that has a detection range where the object having been detected through preliminary detection under the full wave transmission control is located.

4. The object detection system according to claim 2, wherein the wave transmission control circuit serves to perform, when the execution condition is satisfied, the full wave transmission control on the two or more of the plurality of distance measurement sensors belonging to the predetermined group such that
   each of the two or more of the plurality of distance measurement sensors emits ultrasonic waves in a wave transmission time that is shorter than a wave transmission time per one emission of ultrasonic waves from each of the plurality of distance measurement sensors under the cyclic wave transmission control, and
   at least part of wave transmission periods overlap with each other.

5. The object detection system according to claim 4, wherein a total wave transmission period for which the two or more of the plurality of distance measurement sensors emit ultrasonic waves under the full wave transmission control is shorter than twice of the wave transmission time per one emission of ultrasonic waves from each of the plurality of distance measurement sensors under the cyclic wave transmission control.

6. The object detection system according to claim 2, wherein the wave transmission control circuit serves to repeat the cyclic wave transmission control after controlling, to emit ultrasonic waves a predetermined number of times, the one of the two or more of the plurality of distance measurement sensors that has a detection range where the object having been detected through preliminary detection under the full wave transmission control is located.

7. The object detection system according to claim 1, wherein the determination circuit serves to determine the object as the detection target object in response to any one of the plurality of distance measurement sensors detecting the object a predetermined number of times under the cyclic wave transmission control.

8. The object detection system according to claim 1, wherein the determination circuit serves to determine the object as the detection target object in response to any one of the plurality of distance measurement sensors detecting the object a predetermined number of times during the preliminary detection and the cyclic wave transmission control.

9. The object detection system according to claim 1, wherein the wave transmission control circuit serves to repeat the cyclic wave transmission control after setting, as the top of the wave transmission order, one of the plurality of distance measurement sensors that has a detection range where the object having been detected through preliminary detection by an object detection sensor is located when an execution condition is satisfied, the execution condition being satisfied when power supply to the vehicle is started and a vehicle state of the vehicle indicates a predetermined state.

10. The object detection system according to claim 1, wherein
the plurality of distance measurement sensors includes a first group located at a rear part of the vehicle and a second group located at a front part of the vehicle, and
the wave transmission control circuit serves to control the first group to emit ultrasonic waves at a frequency different from that of the second group.

11. An object detection method comprising:
performing preliminary detection using a plurality of distance measurement sensors in response to a power supply to a vehicle being started, the plurality of distance measurement sensors provided at different positions from each other in the vehicle;
selecting one of the plurality of distance measurement sensors that has a detection range where an object is located in the preliminary detection;
setting a wave transmission order of the plurality of distance measurement sensors, the selected one of the plurality of distance measurement sensors set as a top of the wave transmission order;
repeating a cyclic wave transmission control on the plurality of distance measurement sensors, the plurality of distance measurement sensors emit ultrasonic waves sequentially in the wave transmission order in each cyclic wave transmission;
determining the object as a detection target object in response to any one of the plurality of distance measurement sensors detecting the object a predetermined number of times; and
in case two or more objects are detected through the preliminary detection, repeating the cyclic wave transmission control after setting, as the top of the wave transmission order, one of the plurality of distance measurement sensors that has a detection range where one of the two or more objects closest to the vehicle is located.

12. The object detection method according to claim 11, further comprising:
performing, when an execution condition is satisfied, full wave transmission control on two or more of the plurality of distance measurement sensors belonging to a predetermined group to emit ultrasonic waves, the execution condition being satisfied when power supply to the vehicle is started and a vehicle state of the vehicle indicates a predetermined state, and
repeating the cyclic wave transmission control after setting, as the top of the wave transmission order, one of the two or more of the plurality of distance measurement sensors that has a detection range where the object having been detected through preliminary detection under the full wave transmission control is located.

13. The object detection method according to claim 12, further comprising:
performing, when the execution condition is satisfied, the full wave transmission control on the two or more of the plurality of distance measurement sensors belonging to the predetermined group to emit ultrasonic waves, the predetermined group corresponding to the execution condition, and
repeating the cyclic wave transmission control on the two or more of the plurality of distance measurement sensors, which belong to the predetermined group corresponding to the execution condition, to emit ultrasonic waves sequentially in the wave transmission order after setting, as the top of the wave transmission order, one of the two or more of the plurality of distance measurement sensors that has a detection range where the object having been detected through preliminary detection under the full wave transmission control is located.

14. The object detection method according to claim 12, further comprising:
performing, when the execution condition is satisfied, the full wave transmission control on the two or more of the plurality of distance measurement sensors belonging to the predetermined group such that
each of the two or more of the plurality of distance measurement sensors emits ultrasonic waves in a wave transmission time that is shorter than a wave transmission time per one emission of ultrasonic waves from each of the plurality of distance measurement sensors under the cyclic wave transmission control, and
at least part of wave transmission periods overlap with each other.

15. The object detection method according to claim 14, wherein a total wave transmission period for which the two or more of the plurality of distance measurement sensors emit ultrasonic waves under the full wave transmission control is shorter than twice of the wave transmission time per one emission of ultrasonic waves from each of the plurality of distance measurement sensors under the cyclic wave transmission control.

16. The object detection method according to claim 12, further comprising:
repeating the cyclic wave transmission control after controlling, to emit ultrasonic waves a predetermined number of times, the one of the two or more of the plurality of distance measurement sensors that has a detection range where the object having been detected through preliminary detection under the full wave transmission control is located.

17. An object detection device comprising:
a hardware processor connected to a memory configured to function as:

a wave transmission control circuit serving to
- perform preliminary detection using a plurality of distance measurement sensors in response to a power supply to a vehicle being started, the plurality of distance measurement sensors provided at different positions from each other in the vehicle, the distance measurement sensors each including a wave transmitter configured to emit ultrasonic waves and a wave receiver configured to receive reflected ultrasonic waves reflected at an object,
- select one of the plurality of distance measurement sensors that has a detection range where the object is located in the preliminary detection,
- set a wave transmission order of the plurality of distance measurement sensors, the selected one of the plurality of distance measurement sensors set as a top of the wave transmission order, and
- repeat a cyclic wave transmission control on the plurality of distance measurement sensors, the plurality of distance measurement sensors emit ultrasonic waves sequentially in the wave transmission order in each cyclic wave transmission; and a determination circuit serving to determine the object as a detection target object in response to any one of the plurality of distance measurement sensors detecting the object a predetermined number of times, wherein the wave transmission control circuit serves to, in case two or more objects are detected through the preliminary detection, repeat the cyclic wave transmission control after setting, as the top of the wave transmission order, one of the plurality of distance measurement sensors that has a detection range where one of the two or more objects closest to the vehicle is located.

* * * * *